US010814476B2

(12) United States Patent
Yamaguchi et al.

(10) Patent No.: US 10,814,476 B2
(45) Date of Patent: Oct. 27, 2020

(54) ROBOT SYSTEM

(71) Applicant: Seiko Epson Corporation, Tokyo (JP)

(72) Inventors: Yukihiro Yamaguchi, Sendai (JP); Kazuhiro Kosuge, Sendai (JP); Yasuhisa Hirata, Sendai (JP); Aya Kaisumi, Sendai (JP)

(73) Assignee: Seiko Epson Corporation (JP)

( * ) Notice: Subject to any disclaimer, the term of this patent is extended or adjusted under 35 U.S.C. 154(b) by 389 days.

(21) Appl. No.: 15/944,146

(22) Filed: Apr. 3, 2018

(65) Prior Publication Data

US 2018/0222040 A1 Aug. 9, 2018

Related U.S. Application Data

(63) Continuation of application No. 14/838,789, filed on Aug. 28, 2015, now Pat. No. 9,962,829, which is a
(Continued)

(30) Foreign Application Priority Data

Sep. 15, 2010 (JP) ................. 2010-206661
Nov. 22, 2010 (JP) ................. 2010-260627

(51) Int. Cl.
*B25J 9/00* (2006.01)
*B25J 15/08* (2006.01)
(Continued)

(52) U.S. Cl.
CPC ........... *B25J 9/0093* (2013.01); *B23P 19/007* (2013.01); *B25J 9/0096* (2013.01); *B25J 9/043* (2013.01);
(Continued)

(58) Field of Classification Search
CPC ........ B24J 9/043; B25J 9/0093; B25J 9/0096; B25J 9/1612; B23P 19/007
(Continued)

(56) References Cited

U.S. PATENT DOCUMENTS 4,336,926 A 6/1982 Inagaki et al.
4,423,998 A 1/1984 Inaba et al.
(Continued)

FOREIGN PATENT DOCUMENTS

CN 201424641 Y 3/2010
CN 101726722 A 6/2010
(Continued)

OTHER PUBLICATIONS

Zhang et al., "Dimensional Synthesis of a Flexible Gripper with a High Degree of Stability", Proceedings of the 1996 IEEE International Conference on Robotics and Automation, p. 1025-1030 (1996).
(Continued)

*Primary Examiner* — Peter D Nolan
*Assistant Examiner* — Wae L Louie
(74) *Attorney, Agent, or Firm* — Harness, Dickey & Pierce, P.L.C.

(57) ABSTRACT

A robot includes a gripping section adapted to grip an object by open and close a pair of finger sections, a moving device adapted to relatively move the object and the gripping section, and a control device adapted to control the moving device to move the gripping section relatively toward the object, and dispose the pair of finger sections in a periphery of the object, and then control the gripping section to open and close the pair of finger sections in a plane parallel to a mounting surface on which the object is mounted, pinch the object between the pair of finger sections from a lateral side
(Continued)

of the object, and grip the object with the gripping section at at least three contact points.

14 Claims, 16 Drawing Sheets

Related U.S. Application Data continuation of application No. 13/232,198, filed on Sep. 14, 2011, now Pat. No. 9,149,928.

(51) Int. Cl.
  *B23P 19/00*  (2006.01)
  *B25J 9/04*  (2006.01)
  *B25J 9/16*  (2006.01)
(52) U.S. Cl.
  CPC ........... *B25J 9/1612* (2013.01); *B25J 15/08* (2013.01); *Y10S 901/27* (2013.01); *Y10S 901/50* (2013.01)
(58) Field of Classification Search
  USPC ................................. 701/245, 253
  See application file for complete search history.

(56) References Cited

U.S. PATENT DOCUMENTS

| | | | |
|---|---|---|---|
| 4,505,636 A | 3/1985 | Sugino et al. | |
| 4,545,722 A | 10/1985 | Cutkosky et al. | |
| 4,752,094 A | 6/1988 | Tabeau | |
| 4,894,103 A | 1/1990 | Bailey | |
| 4,970,448 A | 11/1990 | Torii et al. | |
| 5,201,501 A | 4/1993 | Fassler | |
| 5,206,930 A | 4/1993 | Ishikawa et al. | |
| 5,328,224 A | 7/1994 | Jacobsen et al. | |
| 5,353,490 A | 10/1994 | Kukuljan | |
| 5,687,831 A | 11/1997 | Carlisle | |
| 6,002,840 A * | 12/1999 | Hofmeister | H01L 21/67265 700/245 |
| 6,062,567 A | 5/2000 | Uetono et al. | |
| 6,249,591 B1 | 6/2001 | Tullis | |
| 6,256,555 B1 | 7/2001 | Bacchi et al. | |
| 6,256,868 B1 | 7/2001 | Sugito et al. | |
| 6,311,981 B1 | 11/2001 | Uetono et al. | |
| 6,315,103 B1 | 11/2001 | Boucherie | |
| 6,592,324 B2 | 7/2003 | Downs et al. | |
| 6,681,151 B1 | 1/2004 | Weinzimmer et al. | |
| 6,804,880 B2 | 10/2004 | Yamamoto | |
| 6,816,755 B2 | 11/2004 | Habibi et al. | |
| 7,125,059 B2 | 10/2006 | Miyamoto | |
| 7,422,411 B2 | 9/2008 | Downs et al. | |
| 7,654,595 B2 | 2/2010 | Yokoyama et al. | |
| 7,813,837 B2 | 10/2010 | Furubo | |
| 7,909,155 B2 | 3/2011 | Lupton et al. | |
| 7,950,710 B2 | 5/2011 | Matsukuma et al. | |
| 8,030,588 B2 | 10/2011 | Culp et al. | |
| 8,060,248 B1 | 11/2011 | Boyer et al. | |
| 8,141,924 B2 | 3/2012 | Albin | |
| 8,155,787 B2 | 4/2012 | Chalubert et al. | |
| 8,196,492 B1 | 6/2012 | Denu | |
| 8,280,551 B2 | 10/2012 | Tani | |
| 8,322,249 B2 | 12/2012 | Seavey et al. | |
| 8,335,591 B2 | 12/2012 | Takahashi | |
| 8,414,043 B2 | 4/2013 | Albin et al. | |
| 8,627,558 B2 | 1/2014 | Lundberg et al. | |
| 9,152,145 B2 | 10/2015 | Culp et al. | |
| 2002/0157241 A1 | 10/2002 | Yamamoto | |
| 2004/0186624 A1 | 9/2004 | Oda et al. | |
| 2006/0012198 A1 | 1/2006 | Hager et al. | |
| 2006/0232086 A1 | 10/2006 | Hariki et al. | |
| 2007/0065144 A1* | 3/2007 | Hofmeister | H01L 21/68 396/611 |
| 2008/0052895 A1 | 3/2008 | Klemm | |
| 2008/0099381 A1 | 5/2008 | Culp et al. | |
| 2009/0065330 A1 | 3/2009 | Lupton et al. | |
| 2009/0067973 A1 | 3/2009 | Eliuk et al. | |
| 2010/0106297 A1 | 4/2010 | Inazumi et al. | |
| 2010/0187846 A1 | 7/2010 | Crezee | |
| 2010/0236046 A1 | 9/2010 | Lundberg et al. | |
| 2012/0207574 A1* | 8/2012 | La Rovere | B25J 15/00 414/751.1 |
| 2018/0078034 A1* | 3/2018 | Savall | B25J 13/088 |
| 2018/0222040 A1* | 8/2018 | Yamaguchi | B25J 15/08 |
| 2020/0101627 A1* | 4/2020 | Yamazaki | B25J 9/0009 |

FOREIGN PATENT DOCUMENTS

| | | |
|---|---|---|
| EP | 1442848 A2 | 8/2004 |
| JP | 48-029567 U | 8/1971 |
| JP | 52-077173 | 12/1975 |
| JP | 55-066791 | 5/1980 |
| JP | 57-061486 | 4/1982 |
| JP | 59-001183 | 1/1984 |
| JP | 59-007589 | 1/1984 |
| JP | 59-175976 | 10/1984 |
| JP | 59-205287 A | 11/1984 |
| JP | 61-099493 | 6/1986 |
| JP | 61-201791 | 12/1986 |
| JP | 62-116513 U | 7/1987 |
| JP | 63-251186 A | 10/1988 |
| JP | 02-249420 A | 10/1990 |
| JP | 03-179505 A | 8/1991 |
| JP | 03-239491 A | 10/1991 |
| JP | 03-126590 U | 12/1991 |
| JP | 05-253876 A | 10/1993 |
| JP | 06-024883 U | 4/1994 |
| JP | 08-216073 A | 8/1996 |
| JP | 08-300283 A | 11/1996 |
| JP | 08-323669 A | 12/1996 |
| JP | 09-057543 A | 3/1997 |
| JP | 10-071591 | 3/1998 |
| JP | 10-202569 A | 8/1998 |
| JP | 11-004956 A | 1/1999 |
| JP | 2001-105374 A | 4/2001 |
| JP | 2002-254382 A | 9/2002 |
| JP | 2004-230513 A | 8/2004 |
| JP | 2006-068893 A | 3/2006 |
| JP | 2006-297514 A | 11/2006 |
| JP | 2009-078312 A | 4/2009 |
| JP | 2009-113167 A | 5/2009 |

OTHER PUBLICATIONS

Henning Schmidt, Sergio Velastin, "Fuzzy Control for a Robot Gripper System to Handle Slipping Objects", EUFIT97, 5th European congress on Intelligent techniques and soft computing, Aachen, Germany, Sep. 8-11, 1997.

* cited by examiner

ROBOT SYSTEM

CROSS-REFERENCE TO RELATED APPLICATIONS

This application is a continuation of U.S. patent application Ser. No. 14/838,789, filed Aug. 28, 2015, which is a continuation of U.S. patent application Ser. No. 13/232,198 filed Sep. 14, 2011, now U.S. Pat. No. 9,149,928 issued Oct. 6, 2015, which claims priority to Japanese Patent Application No. 2010-206661, filed Sep. 15, 2010 and Japanese Patent Application No. 2010-260627, filed Nov. 22, 2010, all of which are hereby expressly incorporated by reference herein in their entireties.

BACKGROUND

1. Technical Field

The present invention relates to a robot.

2. Related Art

In the past, vertical articulated robots, horizontal articulated robots (scalar robots), Cartesian coordinate robots, and so on have been developed as industrial robots, and are selected in accordance with purposes suitable for the features thereof. In such robots, a gripping section for gripping the object is moved to a target position, and then the gripping section is made to grip the object.

Such industrial robots are required to effectively grab the object, which takes a variety of unspecified postures, in a predetermined posture in working processes such as an automatic assembly process. For example, in the robot described in JP-A-2009-78312 (Document 1), it is arranged that a chuck mechanism for gripping the object can be rotated by a rotation mechanism in forward and reverse directions around the center shaft for supporting the chuck itself, and further, the rotation mechanism itself can pivot within a predetermined downward angle range with a pivot mechanism.

According to the technology of Document 1, since the control device controls the rotation mechanism and the pivot mechanism, it is conceivable that the chuck can be oriented toward a variety of directions, and the object in a variety of postures can be gripped with the chuck mechanism due to the control of the control device.

However, if the object is, for example, small-sized and lightweight, it becomes difficult to accurately detect the position and the posture of the object using a camera, and accurate positioning of the chuck mechanism for gripping the object is not achievable in some cases. If the accurate positioning of the chuck mechanism is not achievable, the object and the chuck mechanism might have contact with each other at an unintended place during the gripping operation. On that occasion, since the object is lightweight, the object moves in an unintended direction, and there arises a problem that it is not achievable to hold the object at a desired position or a problem that the object flies out of the gripping space.

SUMMARY

An advantage of some aspects of the invention is to provide a robot capable of reliably gripping the object at a predetermined position without failing to catch the object.

An aspect of the invention is directed to a robot including a gripping section adapted to grip an object by open and close a pair of finger sections, a moving device adapted to relatively move the object and the gripping section, and a control device adapted to control the moving device to move the gripping section relatively toward the object, and dispose the pair of finger sections in a periphery of the object, and then control the gripping section to open and close the pair of finger sections in a plane parallel to a mounting surface on which the object is mounted, pinch the object between the pair of finger sections from a lateral side of the object, and grip the object with the gripping section at at least three contact points.

According to the robot described above, since the pair of finger sections are moved to the periphery of the object and then opened and closed in the plane parallel to the mounting surface on which the object is mounted due to the control by the control device, it results that the periphery of the object is surrounded by the pair of finger sections. Thus, the object is prevented from jumping out of the area surrounded by the pair of finger sections. Further, since the pair of finger sections pinch the object from the lateral side thereof, the object moves with the operation of the pair of finger sections, and thus the position is adjusted. Further, since the gripping section grips the object at at least three contact points, it is possible to restrict the position of the object and to grip the object stably with the friction at the contact points. According to such an operation of the gripping section as described above, the object can be gripped at a predetermined position. Therefore, it is possible to provide the robot capable of preventing the object from escaping, and reliably gripping the object at a predetermined position.

The robot of the aspect of the invention may be configured such that the gripping section opens and closes the pair of finger sections by translating the pair of finger sections in a direction of getting away from each other and a direction of getting close to each other.

According to the robot of this configuration, it is arranged that the pair of finger sections are translated to each other to thereby pinch the object from the lateral side thereof. Therefore, it results that the object moves in roughly the same direction as the open/close direction of the pair of finger sections. Therefore, it is possible to make the open/close mechanism of the pair of finger sections have an easy and simple configuration.

The robot of the aspect of the invention may be configured such that the gripping section opens and closes the pair of finger sections by rotating at least one of the pair of finger sections around a rotational axis perpendicular to the mounting surface.

According to the robot of this configuration, it is arranged that at least one of the pair of finger sections rotates to thereby pinch the object from the lateral side thereof. Therefore, it results that the object moves so as to be pulled in in the direction of the rotation of the at least one of the pair of finger sections. Therefore, it is possible to make the open/close mechanism of the pair of finger sections have an easy and simple configuration.

The robot of the aspect of the invention may be configured such that at least one of the pair of finger sections has contact with the object at at least two contact points on a gripping surface adapted to grip the object from the lateral side.

By thus increasing the contact points, it becomes easy to grip the object stably at a predetermined position.

The robot of the aspect of the invention may be configured such that the gripping section is provided with a main body section to which the pair of finger sections are coupled, and grips the object at at least three contact points by making the object have contact with the pair of finger sections and the main body section.

The robot of the aspect of the invention may be configured such that at least one of the pair of finger sections has a guard adapted to prevent the object from jumping out in a direction perpendicular to the mounting surface, the guard being disposed on an opposite side to the mounting surface across the object.

According to the robot of this configuration, it is possible to prevent the object from jumping out upward when pinching the object.

The robot of the aspect of the invention may be configured such that a camera adapted to take a picture of the object is further provided, and the control device detects a position of the object based on a result of taking a picture by the camera, and then controls the moving device to move the gripping section relatively toward the object.

According to the robot of this configuration, the accurate positioning of the gripping section for gripping the object can be performed.

The robot of the aspect of the invention may be configured such that the gripping section is provided with a main body section to which the pair of finger sections are coupled, and the camera is attached to the main body section.

According to the robot of this configuration, since the camera is disposed at a position near to the pair of finger sections, it is possible to perform accurate positioning of the pair of finger sections for gripping the object.

The robot of the aspect of the invention may be configured such that each of the pair of finger sections includes a tip section disposed in parallel to the mounting surface, and adapted to grip the object, and a base end section disposed in a direction of getting apart from the mounting surface, and coupled to the main body section.

In the case of gripping the object mounted on the mounting surface, by making the pair of finger sections have contact with the mounting surface while making the pair of finger sections perform the gripping operation, it becomes easy to stably grip the object. If there is adopted the configuration, for example, in which the tip section and the base end section are arranged in parallel to each other in the pair of finger sections, the main body section and the mounting surface have contact with each other when gripping the object, and the tip section and the mounting surface become distant from each other to thereby make it difficult to stably grip the object. However, according to the configuration, it becomes easy to make the tip sections of the pair of finger sections have contact with the mounting surface. Therefore, it becomes easy to grip the object stably at a predetermined position.

The robot of the aspect of the invention may be configured such that the tip section of each of the pair of finger sections has a flat surface opposed to the mounting surface.

According to the robot of this configuration, it becomes easy to make the tip sections of the pair of finger sections have contact with the mounting surface compared to the configuration in which the surface of the tip section of each of the pair of finger sections opposed to the mounting surface is an uneven surface. Therefore, it becomes easy to grip the object stably at a predetermined position.

The robot of the aspect of the invention may be configured such that the tip section and the base end section are arranged so as to eliminate an overlap between the tip section and the base end section in a view from a direction in which the camera takes a picture of the tip section.

According to the robot of this configuration, it is possible to perform the gripping operation while checking the gripping operation of the tip sections.

The robot of the aspect of the invention may be configured such that the angle formed between the tip section and the base end section is an obtuse angle.

If there is adopted a configuration, for example, in which the angle formed between the tip section and the base end section is an acute angle, there is a possibility that the tip section is shaded by the base end section when viewed from the direction in which the image of the tip section is taken by the camera, and it becomes difficult to detect the accurate gripping operation of the tip sections. However, according to the configuration, the tip sections are hardly shaded by the base end sections viewed from the direction in which the image of the tip sections is taken by the camera. Therefore, it becomes easy to perform the gripping operation while checking the gripping operation of the tip sections.

The robot of the aspect of the invention may be configured such that the gripping section includes a detection device adapted to detect a force for gripping the object, and the control device controls the force of the gripping section for gripping the object based on a detection result of the detection device.

According to the robot of this configuration, the gripping force of the gripping section can be controlled so as not to apply an excessive load to the object. Therefore, it becomes possible to prevent the object from being deformed or damaged when gripping the object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
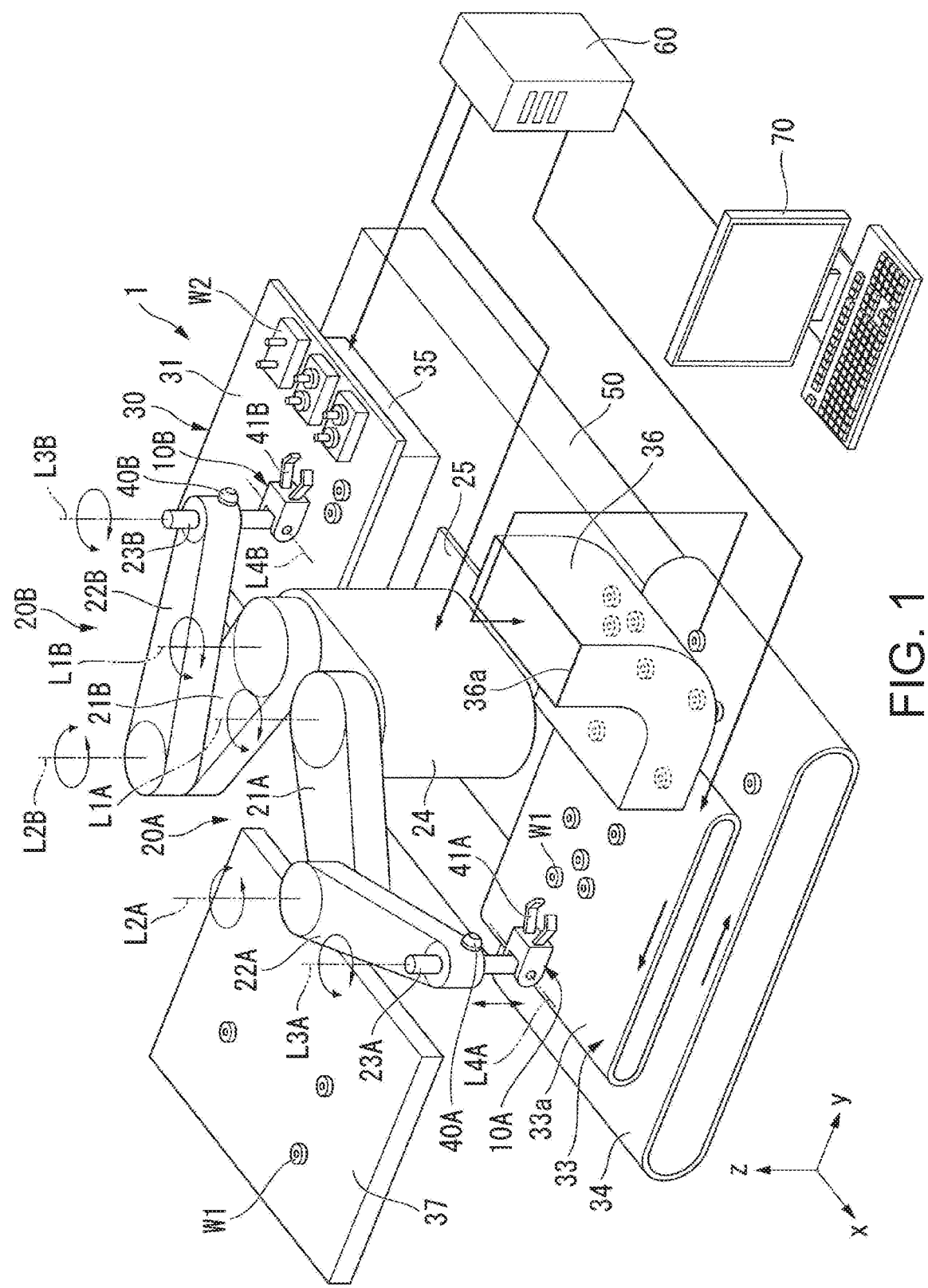
FIG. 1 is a perspective view showing a schematic configuration of a robot according to a first embodiment of the invention.

Hereinafter, some embodiments of the invention will be described with reference to the accompanying drawings. The embodiments each show an aspect of the invention, but do not limit the scope of the invention, and can arbitrarily be modified within a technical concept of the invention. Further, in the drawings explained hereinafter, in order for making each constituent easy to understand, the actual structures and the structures of the drawings are different from each other in scale size, number, and so on.

In the explanation described below, the XYZ Cartesian coordinate system shown in FIG. 1 is set, and each of the members will be explained with reference to the Cartesian coordinate system. In the Cartesian coordinate system, the X axis and the Y axis are set in parallel to a horizontal plane and perpendicular to each other, and the Z axis is set in a direction (a vertical direction) perpendicular to both of the X axis and the Y axis.

First Embodiment

FIG. 1 is a perspective view showing a schematic configuration of a robot 1 according to a first embodiment of the invention. In FIG. 1, the reference symbol W1 denotes a first object and the reference symbol W2 denotes a second object. Further, the reference symbol L1A denotes a rotational axis of a first arm 21A, the reference symbol L2A denotes a rotational axis of a second arm 22A, the reference symbol L3A denotes a rotational axis of a third arm 23A, and the reference symbol L4A denotes a rotational axis of a gripping section 10A. The reference symbol L1B denotes a rotational axis of a first arm 21B, the reference symbol L2B denotes a rotational axis of a second arm 22B, the reference symbol L3B denotes a rotational axis of a third arm 23B, and the reference symbol L4B denotes a rotational axis of a gripping section 10B.

Here, it is assumed that the explanation will be presented exemplifying the first object W1 by a small-sized lightweight gear, and exemplifying the second object W2 by an electronic device provided with a support shaft (a pin) for rotatably supporting the gear. It should be noted that the first object W1 has a roughly columnar shape having a curved surface on the side having contact with the gripping section.

As shown in FIG. 1, the robot 1 according to the present embodiment is provided with the gripping sections 10A, 10B for gripping the object by opening and closing a pair of finger sections, the arms (moving device) 20A, 20B for relatively moving the objects and the gripping sections 10A, 10B, conveyer belts 33, 34 for conveying the first object W1, a feeder 36 for carrying the first object W1 on the first conveyer belt (moving device) 33, a stage 37 forming a pedestal used for transferring the first object W1, a stage (moving device) 30 for mounting the objects W1, W2, a base 50 for supporting the arms 20A, 20B and the stage 30, cameras 40A, 40B attached respectively to the arms 20A, 20B, a control device 60 for controlling the operation of the robot 1 itself, and an input device 70 for performing instruction input to the control device 60.

The gripping section 10A is coupled to a tip portion of the third arm 23A. The gripping section 10A grips the first object W1 disposed on the first conveyer belt 33. The gripping section 10A conveys the first object W1 thus gripped to the stage 37. The gripping section 10A is provided with a detection device 41A for detecting the force used for gripping the first object W1. As the detection device 41A, there can be used, for example, a pressure sensor, or a sensor for detecting the variation in the torque of an electric motor (the variation in the current flowing through the electric motor).

The gripping section 10B is coupled to a tip portion of the third arm 23B. The gripping section 10B grips the first object W1 disposed on the stage 37. The gripping section 10B conveys the first object W1 thus gripped to the stage 30. The gripping section 10B conveys the first object W1 thus gripped (or disposed on the stage 37) to the second object W2. Specifically, the gripping section 10B inserts the pin of the electronic device W2 into the gear W1. The gripping section 10B is provided with a detection device 41B for detecting the force used for gripping the first object W1. As the detection device 41B, there can be used, for example, a pressure sensor, or a sensor for detecting the variation in the torque of an electric motor (the variation in the current flowing through the electric motor).

The arm 20A has the first arm 21A, the second arm 22A, and the third arm 23A coupled in this order, and the first arm 21A is coupled to the base 50 via a main shaft 24 having a rotational axis in the Z-axis direction and a bottom section 25 having a roughly rectangular planar shape. The first arm 21A is disposed rotatably in forward and reverse directions around the rotational axis L1A in a horizontal direction (the direction parallel to the X-Y plane) at the joining section with the main shaft 24. The second arm 22A is disposed rotatably in forward and reverse directions around the rotational axis L2A in the horizontal direction at the joining section with the first arm 21A. The third arm 23A is disposed rotatably in forward and reverse directions around the rotational axis L3A in the horizontal direction and movably in up and down directions (vertical directions (the Z-axis directions)) at the joining section with the second arm 22A. It should be noted that the gripping section 10A is disposed rotatably in forward and reverse directions around the rotational axis L4A in a direction perpendicular to the horizontal direction at the joining section with the third arm 23A.

The arm 20B has the first arm 21B, the second arm 22B, and the third arm 23B coupled in this order, and the first arm 21B is coupled to the base 50 via the main shaft 24 having the rotational axis in the Z-axis direction and the bottom section 25 having a roughly rectangular planar shape. The first arm 21B is disposed rotatably in forward and reverse directions around the rotational axis L1B in the horizontal direction (the direction parallel to the X-Y plane) at the joining section with the main shaft 24. The second arm 22B is disposed rotatably in forward and reverse directions around the rotational axis L2B in the horizontal direction at the joining section with the first arm 21B. The third arm 23B is disposed rotatably in forward and reverse directions around the rotational axis L3B in the horizontal direction and movably in up and down directions (vertical directions (the Z-axis directions)) at the joining section with the second arm 22B. It should be noted that the gripping section 10B is disposed rotatably in forward and reverse directions around the rotational axis L4B in a direction perpendicular to the horizontal direction at the joining section with the third arm 23B.

The first conveyer belt 33 and the second conveyer belt 34 are disposed distant from the side, on which the arm 20A is disposed, in this order. The feeder 36 is disposed on the upstream side (+Y-direction side) of the first conveyer belt 33. The second conveyer belt 34 is arranged to be larger in size than the first conveyer belt 33 in a plan view so as to project toward the downstream direction (−Y-direction side) of the first conveyer belt 33. The first object W1 dropped from the first conveyer belt 33 is conveyed by the second conveyer belt 34 and is then thrown in an opening section 36a of the feeder 36 by a tilted conveyer belt not shown. It is arranged that the first object W1 having failed to be gripped by the gripping section 10A is circulated through the first conveyer belt 33, the second conveyer belt 34, and the feeder 36 in such a manner as described above.

The stage 30 is provided with a top plate 31 for mounting the objects, and a base section 35 for supporting the top plate 31. The base section 35 houses, for example, a moving mechanism for translating the top plate 31 in the X-axis direction and a moving mechanism for moving the top plate 31 in the Y-axis direction independently from each other, and is disposed so as to be able to move the top plate 31 in the horizontal directions.

The camera 40A is attached to the tip portion of the second arm 22A constituting the arm 20A. As the camera 40A, for example, a CCD camera is used. The camera 40A takes the picture of the first object W1 mounted on the first conveyer belt 33. The shot image of the camera 40A is transmitted to the control device 60.

The camera 40B is attached to the tip portion of the second arm 22B constituting the arm 20B. As the camera 40B, for example, a CCD camera is used. The camera 40B takes the picture of the first object W1 and the second object W2 mounted on the top plate 31. The shot image of the camera 40B is transmitted to the control device 60.

The control device 60 incorporates a memory, a CPU, a power supply circuit, and so on. The control device 60 stores, for example, an operation program for defining the operation content of the robot 1 input from the input device 70, and starts up a variety of programs stored in the memory by the CPU to thereby perform the overall control of the robot 1.

Figure 2:
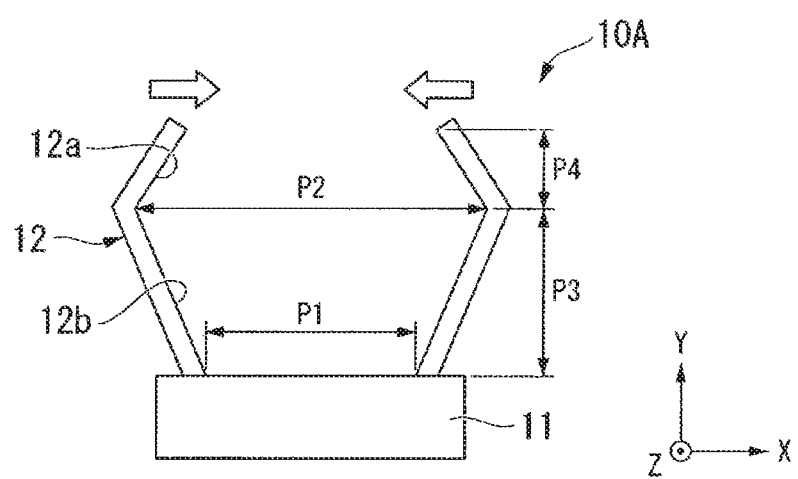
FIG. 2 is a plan view showing a configuration of a gripping section according to the first embodiment.

FIG. 2 is a plan view showing a configuration of the gripping section according to the first embodiment. In FIG. 2, the reference symbol P1 denotes the distance between base ends of a pair of finger sections 12, the reference symbol P2 denotes the distance (the distance between the portions of the pair of finger sections furthest from each other) between bend sections of the pair of finger sections 12, the reference symbol P3 denotes the distance between a main body section 11 and the bend sections of the pair of finger sections 12, and the reference symbol P4 denotes the distance between the bend sections and tip portions of the pair of finger sections 12. Here, a configuration of the gripping section will be explained showing the gripping section 10A out of the gripping sections 10A, 10B as an example. Since the gripping section 10B has substantially the same configuration as that of the gripping section 10A, the detailed explanation thereof will be omitted.

As shown in FIG. 2, the gripping section 10A is provided with the main body section 11 and the pair of finger sections 12. The main body section 11 has a roughly rectangular planar shape. The pair of finger sections 12 are coupled to one end of the main body section 11, and are disposed movably based on the side (the side connected to the main body section 11) of the one end. Specifically, the gripping section 10A is arranged to translate the pair of finger sections 12 in a direction of getting away from each other and a direction of getting close to each other to thereby open and close the pair of finger sections 12.

The "finger section" of the pair of finger sections 12 is composed of one finger or a plurality of fingers. It should be noted that if the finger section is composed of a plurality of fingers, the operation of one of the fingers is followed by the operation of the rest of the fingers. In other words, it is not achievable that one of the fingers and the rest thereof operate independently from each other.

The moving mechanism (the slide mechanism) of the pair of finger sections 12 has, for example, a configuration of providing a linear groove (through hole) to the main body section 11, providing a projection to the base end of each of the pair of finger sections 12, and moving the pair of finger sections 12 along the linear groove by a drive device such as an electric motor. The pair of finger sections 12 has a configuration of a "single-degree-of-freedom system (the system in which the position of an object can be expressed by a single parameter)" in which the two finger sections 12 are controlled using the distance of the translation as the single parameter.

The pair of finger sections 12 are formed bending so that the sides opposed to each other each form a concave shape. The pair of finger sections 12 each have a plurality of (two) gripping surfaces 12a, 12b intersecting with each other on the side having contact with the first object W1 on the lateral side thereof. The pair of finger sections are arranged to have contact with the first object W1 at four or more contact points in the gripping surfaces 12a, 12b for gripping the first object W1 from the lateral side thereof. By thus increasing the contact points, it becomes easy to grip the first object W1 stably at a predetermined position. The pair of finger sections 12 can be formed by, for example, bending metal (flat plate) such as aluminum, or cutting the metal (rectangular solid).

In both of the pair of finger sections 12, the gripping surfaces 12a, 12b (see FIG. 2) are perpendicular to the surface (the upper surface of the first conveyer belt 33) 33a on which the first object W1 is mounted. It should be noted that in the explanation below, the surface (the upper surface of the first conveyer belt 33) on which the first object W1 is mounted is referred to simply as a "mounting surface" in some cases.

The distance P1 between the base ends of the pair of finger sections 12 is set smaller than the distance P2 between the bend sections of the pair of finger sections 12. The distance P3 between the main body section 11 and the bend sections of the pair of finger sections 12 is set larger than the distance P4 between the bend sections and the tips of the pair of finger sections 12. According to such a configuration, it results that the first object W1 is gripped by the pair of finger sections 12 in the vicinity of the tips thereof. The control device 60 performs the control so as to make the pair of finger sections 12 grip the first object W1 at four or more contact points.

Incidentally, if the object is, for example, small-sized and lightweight, it becomes difficult to accurately detect the position and the posture of the object using a camera, and accurate positioning of the gripping section for gripping the object is not achievable in some cases. If the accurate positioning of the gripping section is not achievable, the object and the gripping section might have contact with each other at an unintended place during the gripping operation. On that occasion, since the object is lightweight, the object moves in an unintended direction, and there arises a problem that it is not achievable to hold the object at a desired position or a problem that the object flies out of the gripping space.

Figure 16:
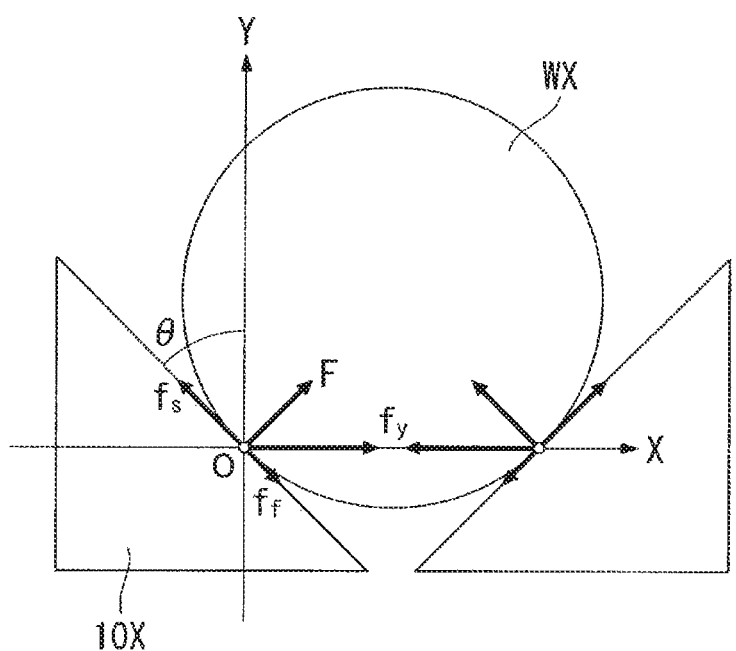
FIG. 16 is a diagram showing a relationship between the forces caused when gripping the object with the gripping section.

FIG. 16 is a diagram showing the relationship (the relationship between the frictional force and the push-out force for realizing the self-alignment) between the forces generated when gripping an object WX with a gripping section 10X. In FIG. 16, an X-Y coordinate system is set on the surface on which the object WX is disposed, and the contact point between one side (−X-direction side) of the gripping section and the object WX is set as an origin. In FIG. 16, the reference symbol F denotes the force with which the gripping section 10X pushes out the object WX, the reference symbol $f_s$ denotes the component of the push-out force F in the direction of the incline of the gripping section 10X, the reference symbol $f_y$ denotes the X-axis direction component of the push-out force F, the reference symbol $f_f$ denotes the frictional force exerted on the object WX from the gripping section 10X, and the reference symbol θ denotes the angle formed between the incline of the gripping section 10X and the Y axis. It should be noted that since the mass of the object WX is small, the frictional force between the object WX and the surface on which the object WX is disposed is ignored in this drawing.

As shown in FIG. 16, by decomposing the force F with which the gripping section 10X pushes out the object WX into the component $f_s$ in the direction of the incline of the gripping section 10X and the X-axis direction component $f_y$, the components are expressed as Formulas 1 and 2 below. It should be noted that the component $f_y$ is canceled out.

$$f_s = F \tan \theta \quad (1)$$

$$f_y = F/\cos \theta \quad (2)$$

Further, the frictional force $f_f$ exerted on the object WX from the gripping section 10X can be expressed as Formula 3 below assuming the frictional coefficient as μ.

$$f_f = \mu F \quad (3)$$

Here, the condition for the object WX to be pushed out by the gripping section 10X is expressed as Formula 4 below.

$$f_s > f_f \quad (4)$$

Therefore, according to Formulas 1, 3, and 4, the condition for the object WX to be pushed out by the gripping section 10X is expressed as Formula 5 below.

$$\mu < \tan \theta \quad (5)$$

According to the above description, it is understood that when gripping the object WX with the gripping section 10X, by fulfilling Formula 5, it is possible to push out the object WX with the gripping section 10X to thereby realize the self-alignment.

Therefore, the robot 1 according to the present embodiment of the invention has a configuration provided with the gripping section 10A for gripping the object (the first object W1) by opening and closing the pair of finger sections 12, the moving device (the arm 20A, the first conveyer belt 33) for moving the first object W1 and the gripping section 10A relatively to each other, and the control device 60 for controlling the moving device to move the gripping section 10A relatively toward the first object W1 to thereby dispose the pair of finger sections 12 in the vicinity of the first object W1, then controlling the gripping section 10A to open and close the pair of finger sections 12 in a plane parallel to the mounting surface 33a on which the first object W1 is mounted to thereby pinch the first object W1 between the pair of finger sections 12 from the lateral side of the first object W1, and thus making the gripping section 10A grip the first object W1 at three or more contact points. Hereinafter, the operation of the robot 1 according to the present embodiment will be explained with reference to FIGS. 3A through 3D, and 4.

Figure 3A:
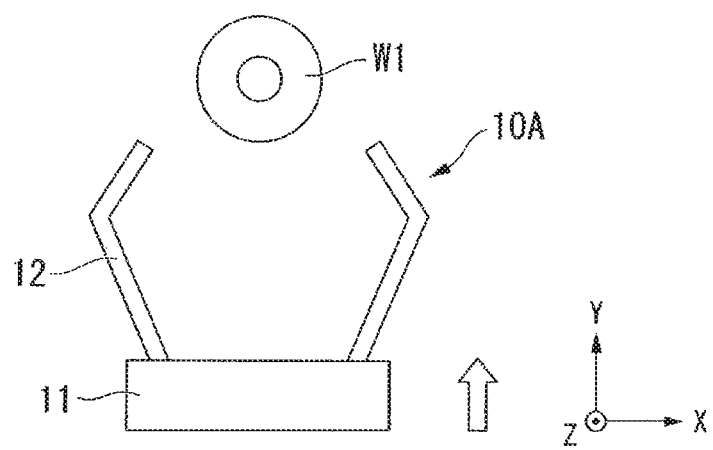
FIGS. 3A through 3D are plan views showing an operation of the gripping section according to the first embodiment.
Figure 3B:
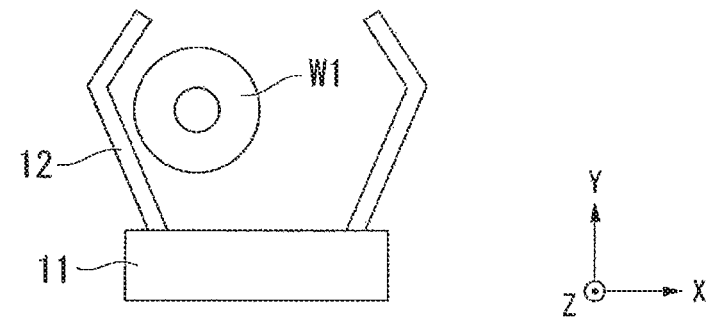
Figure 3C:
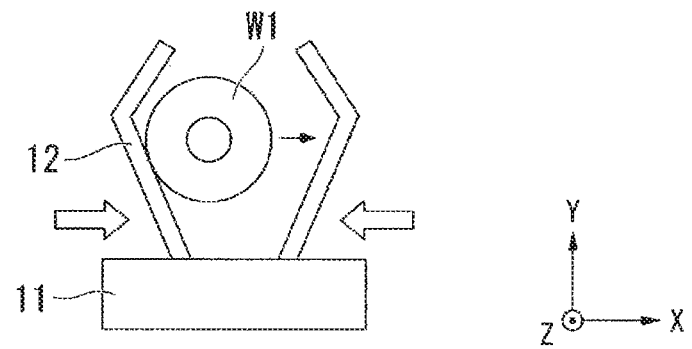
Figure 3D:
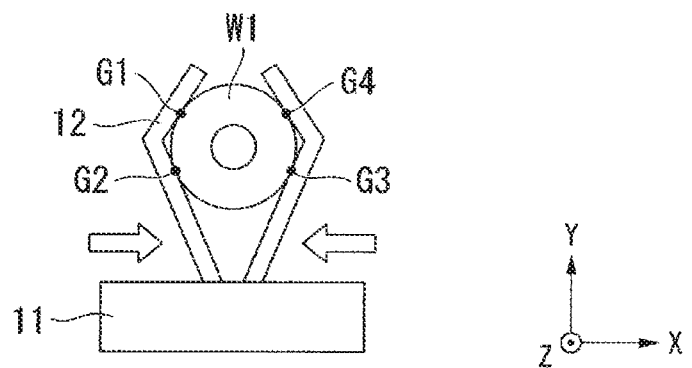
Figure 4:
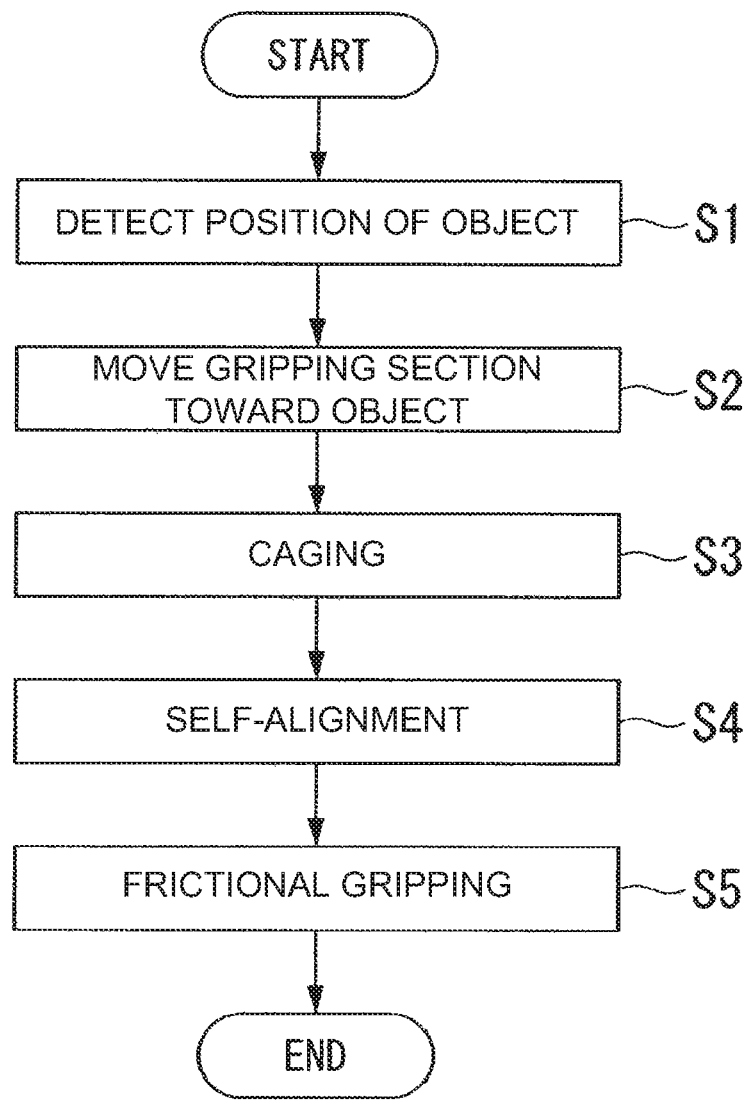
FIG. 4 is a flowchart showing an operation of the robot according to the first embodiment.

FIGS. 3A through 3D are plan views showing the operation of the gripping section according to the first embodiment. FIG. 4 is a flowchart showing the operation of the robot 1 according to the first embodiment. FIG. 3A shows the process of moving the gripping section 10A relatively toward the first object W1, FIG. 3B shows the condition of disposing the pair of finger sections 12 in the periphery of the first object W1, FIG. 3C shows the condition of pinching the first object W1 between the pair of finger sections 12 from the lateral side of the first object W1, and FIG. 3D shows the condition of making the gripping section 10A grip the first object W1. It should be noted that in FIGS. 3A through 3D the reference symbols G1, G2, G3, and G4 denote the contact points between the pair of finger sections 12 and the first object W1. Here, the operation of the gripping section will be explained showing the gripping section 10A out of the gripping sections 10A, 10B as an example. Since the gripping section 10B has substantially the same configuration as that of the gripping section 10A, the detailed explanation thereof will be omitted.

Firstly, the first objects W1 are conveyed to the first conveyer belt 33 using the feeder 36 (see FIG. 1). Subsequently, the image of the first object W1 is taken using the camera 40A. The control device 60 detects the position of the first object W1 mounted on the first conveyer belt 33 (the mounting surface 33a) based on the imaging result of the camera 40A (step S1 shown in FIG. 4).

Subsequently, as shown in FIG. 3A, the control device controls the arm 20A to move the gripping section 10A relatively toward the first object W1 (step S2 shown in FIG. 4). Subsequently, the control device 60 controls the gripping section 10A to grip the first object W1 with the gripping section 10A. Here, the control device 60 makes the gripping section 10A achieve the three functions, namely caging, self-alignment, and frictional gripping of the first object W1.

It should be noted that "caging" denotes the condition in which the object (e.g., the first object W1) at a certain position and a posture exists in a space enclosed by the gripping section 10A and the plane (here, the upper surface 33a of the first conveyer belt 33) on which the object is disposed. In the caging, the position and the posture of the first object W1 are not restricted, but remain free. The term "self-alignment" denotes the operation of moving the first object W1 to a predetermined position in the closed space due to the shape of the gripping section 10A and the frictional force between the gripping section 10A and the first object W1 when pinching the first object W1 with the gripping section 10A. The term "frictional gripping" denotes the operation of making the gripping section 10A hold the first object W1 by having contact therewith at three or more contact points, and holding the first object W1 in a direction perpendicular to the surface 33a on which the first object W1 is disposed using the frictional force, thereby gripping the first object W1.

Specifically, as shown in FIG. 3B, the pair of finger sections 12 is disposed in the periphery of the first object W1, and then the gripping section 10A is controlled to open and close the pair of finger sections 12 in the plane parallel to the surface 33a on which the first object W1 is mounted to thereby make (step S3 shown in FIG. 4) the pair of finger sections 12 surround the periphery of the first object W1. Thus, the first object W1 is prevented from jumping out of the area surrounded by the pair of finger sections 12 (caging).

Subsequently, as shown in FIG. 3C, the first object W1 is pinched between the pair of finger sections 12 from the lateral side of the first object W1 (step S4 shown in FIG. 4). Thus, the first object W1 moves with the pair of finger sections 12, and thus the position thereof is adjusted (self-alignment).

Subsequently, as shown in FIG. 3D, the pair of finger sections 12 are made (step S5 shown in FIG. 4) to grip the first object W1 at three or more contact points (here, the four contact points G1, G2, G3, and G4). Thus, the first object W1 is held at a predetermined position (frictional gripping). On this occasion, the detection device (see FIG. 1) provided to the gripping section 10A detects the force of the gripping section 10A for gripping the first object W1.

By setting the angle formed between the gripping surfaces 12a, 12b (see FIG. 2) and the mounting surface 33a to the angle with which the large contact area with the first object W1 can be provided, it becomes possible to stably grip the first object W1 in the "frictional gripping."

Subsequently, the gripping section 10A conveys the first object W1 thus gripped to the stage 30 (see FIG. 1).

According to the robot 1 of the present embodiment, since the pair of finger sections 12 is opened and closed in a plane parallel to the mounting surface 33a after moving to the periphery of the first object W1 due to the control of the control device 60, it results that the periphery of the first object W1 is surrounded by the pair of finger sections 12. Thus, the first object W1 is prevented from jumping out of the area surrounded by the pair of finger sections 12 (caging). Further, since the pair of finger sections 12 pinch the first object W1 from the lateral side thereof, the first object W1 moves with the pair of finger sections 12, and thus the position is adjusted (self-alignment). Further, since the gripping section 10A grips the object at three or more contact points (here, the four contact points G1, G2, G3, and G4), it is possible to restrict the position of the first object W1, and at the same time, to stably grip the first object W1 due to the friction at the contact points (frictional gripping). According to the operation of the gripping section 10A described above, the first object W1 can be gripped at a predetermined position. Therefore, it is possible to provide the robot 1 capable of preventing the first object W1 from escaping, and reliably gripping the first object W1 at a predetermined position.

According to this configuration, since the gripping section 10A translates the pair of finger sections 12 in the direction of getting away from each other and the direction of getting close to each other to thereby open and close the pair of finger sections 12, it results that the pair of finger sections 12 are translated to each other to thereby pinch the first object W1 from the lateral side. Therefore, it results that the first object W1 moves in roughly the same direction as the open/close direction of the pair of finger sections 12. Therefore, it is possible to make the open/close mechanism of the pair of finger sections 12 have an easy and simple configuration.

According to this configuration, the pair of finger sections 12 have contact with the first object W1 at four or more contact points in the gripping surfaces 12a, 12b for gripping the first object W1 from the lateral side thereof. By thus increasing the contact points, it becomes easy to grip the first object W1 stably at a predetermined position.

According to this configuration, since there is provided the camera 40A for taking the picture of the first object W1, it is possible to perform accurate positioning of the gripping section 10A for gripping the first object W1.

According to this configuration, the gripping section 10A is provided with the detection device 41A for detecting the force used for gripping the first object W1. Therefore, the gripping force of the gripping section 10A can be controlled so that no excessive load is applied to the first object W1. Therefore, it becomes possible to prevent the first object W1 from being deformed or damaged when gripping the first object W1.

It should be noted that although in the present embodiment, the explanation is presented citing the example of providing two arms (the arm 20A and the arm 20B) to every robot, the number of arms is not limited thereto. It is also possible to provide only one arm to every robot, or to provide three or more arms to every robot.

Further, although in the present embodiment, the explanation is presented citing the case in which the first object has a roughly columnar shape as an example, the shape is not limited thereto. It is also possible to use objects having a variety of shapes such as nuts or screws besides the gears (gear wheels) as the first object.

Second Embodiment

Figure 5:
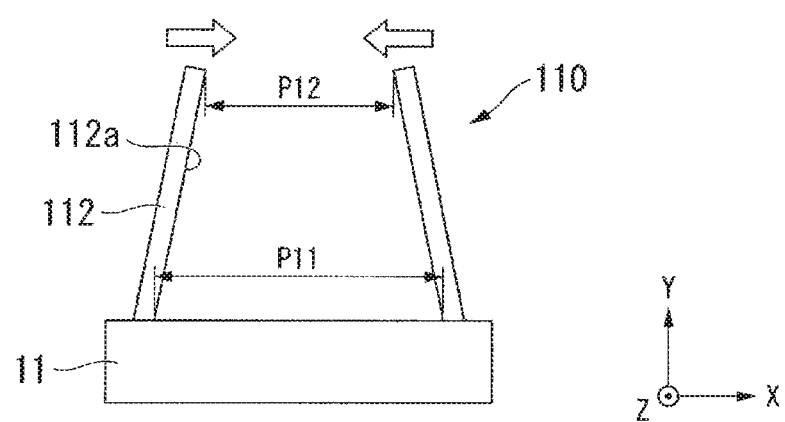
FIG. 5 is a plan view showing a configuration of a gripping section according to a second embodiment.

FIG. 5 is a plan view corresponding to FIG. 2 and showing a configuration of a gripping section 110 according to a second embodiment of the invention. In FIG. 5, the reference symbol P11 denotes the distance between the base ends in a pair of finger sections 112, the reference symbol P12 denotes the distance between the tips of the pair of finger sections 112. The gripping section 110 of the present embodiment is different from the gripping section 10A explained in the first embodiment described above in the point that the first object W1 is gripped at three or more contact points by making the first object W1 have contact with the pair of finger sections 112 and the main body section 11. In FIG. 5, the elements substantially the same as those shown in FIG. 2 are denoted with the same reference symbols and the detailed explanation therefor will be omitted.

As shown in FIG. 5, the gripping section 110 is provided with the main body section 11 and the pair of finger sections 112. The gripping section 110 is arranged to translate the pair of finger sections 112 in a direction of getting away from each other and a direction of getting close to each other to thereby open and close the pair of finger sections 112.

The pair of finger sections 112 extend in one direction (here, the Y-axis direction). The pair of finger sections 112 each have a flat gripping surface 112a on the side having contact with the first object W1 on the lateral side thereof. The gripping surface 112a is perpendicular to the mounting surface 33a. The control device 60 (see FIG. 1) performs the control so as to make the pair of finger sections 112 and the main body section 11 grip the first object W1 at three or more contact points.

The distance P11 between the base ends of the pair of finger sections 112 is set larger than the distance P12 between the tips of the pair of finger sections 112. According to such a configuration, it results that the first object W1 is gripped by the pair of finger sections 112 in the vicinity of the base ends thereof. Hereinafter, the operation of the gripping section 110 according to the present embodiment will be explained with reference to FIGS. 4, and 6A through 6D.

Figure 6A:
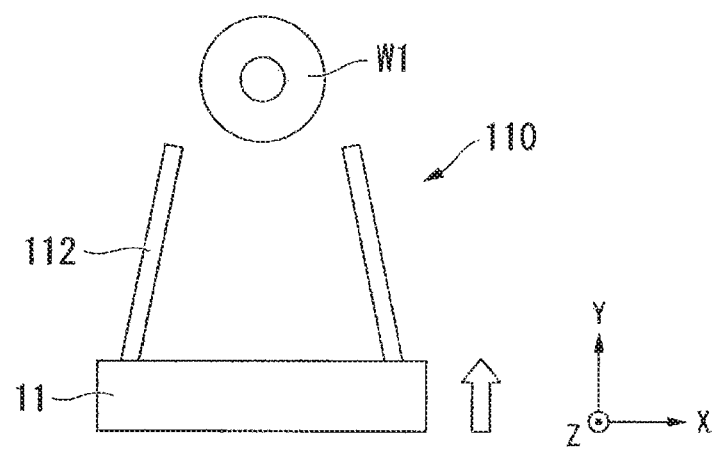
FIGS. 6A through 6D are plan views showing an operation of the gripping section according to the second embodiment.
Figure 6B:
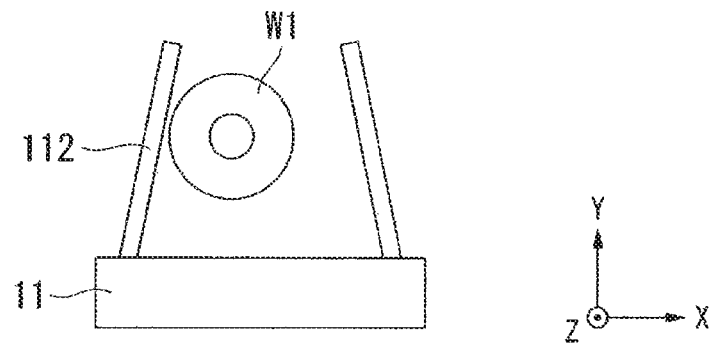
Figure 6C:
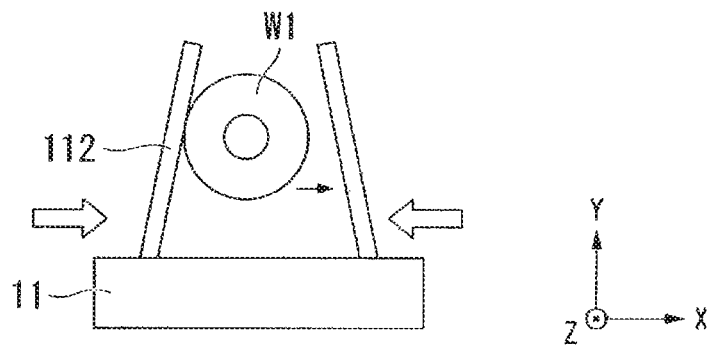
Figure 6D:
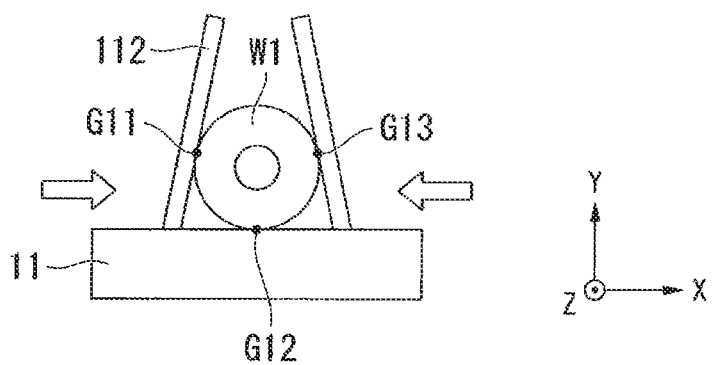

FIGS. 6A through 6D are plan views corresponding respectively to FIGS. 3A through 3D, and showing the operation of the gripping section 110 according to the second embodiment. FIG. 6A shows the process of moving the gripping section 110 relatively toward the first object W1, FIG. 6B shows the condition of disposing the pair of finger sections 112 in the periphery of the first object W1, FIG. 6C shows the condition of pinching the first object W1 between the pair of finger sections 112 from the lateral side of the first object W1, and FIG. 6D shows the condition of making the gripping section 110 grip the first object W1. It should be noted that in FIGS. 6A through 6D the reference symbols G11, G12, and G13 denote the contact points between the gripping section 110 and the first object W1.

Regarding the step S1 shown in FIG. 4, since the operation is substantially the same as the operation of the gripping section 10A according to the first embodiment, the detailed explanation therefor will be omitted.

As shown in FIG. 6A, the control device 60 controls the arm 20A (see FIG. 1) to move the gripping section 110 relatively toward the first object W1 (step S2 shown in FIG. 4). Subsequently, the control device 60 controls the gripping section 110 to grip the first object W1 with the gripping section 110. Here, the control device 60 makes the gripping section 110 achieve the three functions, namely caging, self-alignment, and frictional gripping of the first object W1.

Specifically, as shown in FIG. 6B, the pair of finger sections 112 is disposed in the periphery of the first object W1, and then the gripping section 110 is controlled to open and close the pair of finger sections 112 in the plane parallel to the mounting surface 33a to thereby make (step S3 shown in FIG. 4) the pair of finger sections 112 surround the periphery of the first object W1. Thus, the first object W1 is prevented from jumping out of the area surrounded by the pair of finger sections 112 (caging).

Subsequently, as shown in FIG. 6C, the first object W1 is pinched between the pair of finger sections 112 from the lateral side of the first object W1 (step S4 shown in FIG. 4). Thus, the first object W1 moves with the pair of finger sections 112, and thus the position thereof is adjusted (self-alignment).

Subsequently, as shown in FIG. 6D, the pair of finger sections 112 and the main body section 11 are made (step S5 shown in FIG. 4) to grip the first object W1 at three or more contact points (here, the three contact points G11, G12, and G13). Thus, the first object W1 is held at a predetermined position (frictional gripping).

Third Embodiment

Figure 7A:
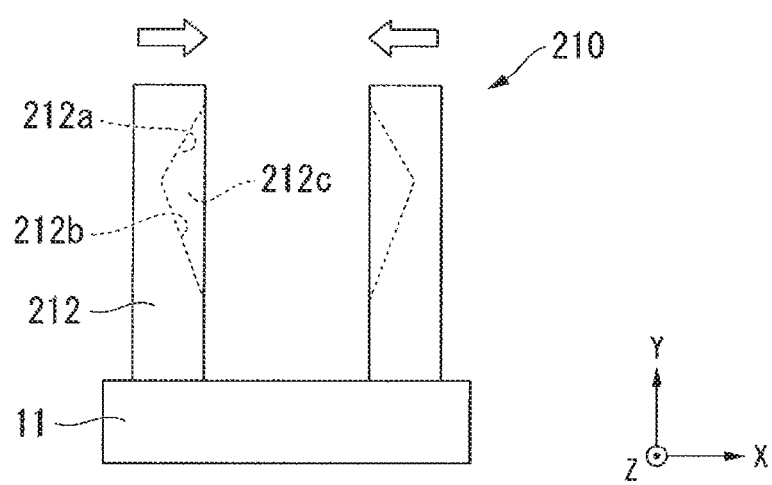
FIGS. 7A and 7B are diagrams showing a configuration of a gripping section according to a third embodiment.
Figure 7B:
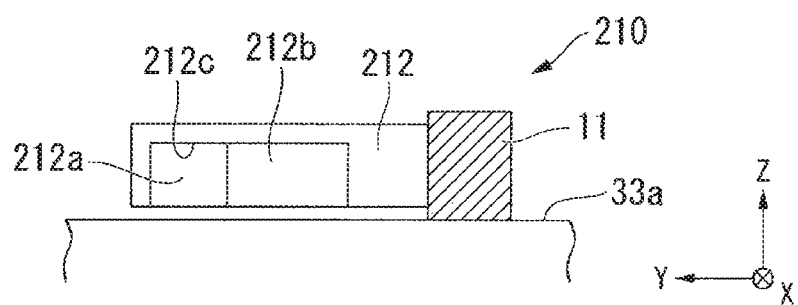

FIGS. 7A and 7B are diagrams showing a configuration of a gripping section 210 according to the third embodiment of the invention. FIG. 7A is a plan view corresponding to FIG. 2, and showing a configuration of the gripping section 210 according to the third embodiment of the invention. FIG. 7B is a cross-sectional view showing a configuration of the gripping section 210 according to the third embodiment of the invention. The gripping section 210 of the present embodiment is different from the gripping section 10A explained in the first embodiment described above in the point that a guard 212c for preventing the first object W1 from jumping out in a direction perpendicular to the mounting surface 33a is disposed on the opposite side of each of the pair of finger sections 212 to the mounting surface 33a across the first object W1. In FIGS. 7A and 7B, the elements substantially the same as those shown in FIG. 2 are denoted with the same reference symbols and the detailed explanation therefor will be omitted.

As shown in FIGS. 7A and 7B, the gripping section 210 is provided with the main body section 11 and the pair of finger sections 212. The gripping section 210 is arranged to translate the pair of finger sections 212 in a direction of getting away from each other and a direction of getting close to each other to thereby open and close the pair of finger sections 212.

The pair of finger sections 212 each have a plurality of (two) gripping surfaces 212a, 212b intersecting with each other on the side having contact with the first object W1 on the lateral side thereof. The gripping surfaces 212a, 212b are perpendicular to the mounting surface 33a. The control device 60 (see FIG. 1) performs the control so as to make the pair of finger sections 212 grip the first object W1 at four or more contact points.

The guard 212c for preventing the first object W1 from jumping out in a direction perpendicular to the mounting surface 33a is disposed on the opposite side of each of the pair of finger sections 212 to the mounting surface 33a across the first object W1. The lower surface of the guard 212c is arranged to be parallel to the mounting surface 33a.

Figure 8A:
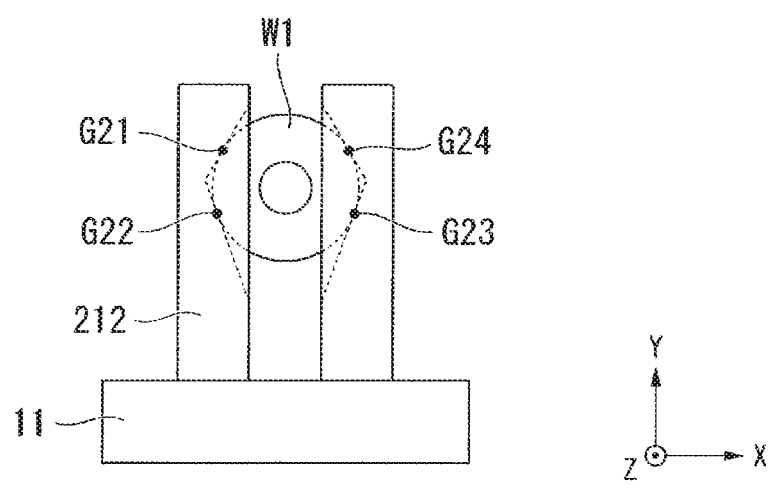
FIGS. 8A and 8B are diagrams showing a condition of the gripping section according to the third embodiment gripping the object.
Figure 8B:
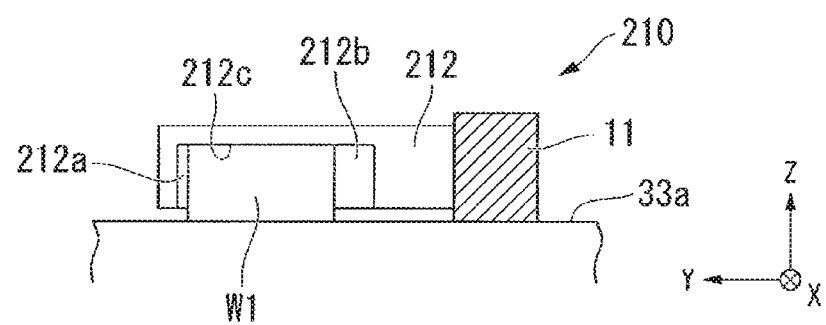

FIGS. 8A and 8B are diagrams showing a condition of gripping the object of the gripping section 210 according to the third embodiment of the invention. FIG. 8A is a plan view corresponding to FIG. 7A, and showing the condition of gripping the object of the gripping section 210 according to the third embodiment of the invention. FIG. 8B is a cross-sectional view corresponding to FIG. 7B, and showing the condition of gripping the object of the gripping section 210 according to the third embodiment of the invention. It should be noted that in FIGS. 8A and 8B the reference symbols G21, G22, G23, and G24 denote the contact points between the gripping section 210 and the first object W1.

As shown in FIG. 8A, the pair of finger sections 212 are controlled (step S5 shown in FIG. 4) to grip the first object W1 at four or more contact points (here, the four contact points G21, G22, G23, and G24). Thus, the first object W1 is held at a predetermined position.

As shown in FIG. 8B, the bottom surface (−Z-direction side) of the first object W1 has contact with the mounting surface 33a, and the top surface (+Z-direction side) of the first object W1 has contact with the lower surface of the guard 212c. In such a manner as described above, the first object W1 is gripped while having contact with the gripping surfaces 212a, 212b, and the lower surface of the guard 212c.

According to the robot of the present embodiment, it is possible to prevent the first object W1 from jumping out upward when pinching the first object W1.

It should be noted that although in the present embodiment, the explanation is presented citing the configuration of providing the guards to both of the pair of finger sections as an example, the configuration is not limited thereto. It is also possible to adopt the configuration of, for example, providing the guard to either one of the pair of finger sections. In other words, it is sufficient for the configuration to provide the guard to at least one of the pair of finger sections. It should be noted that it is required for the guard to have the area sufficient to prevent the first object from jumping out upward.

Fourth Embodiment

Figure 9A:
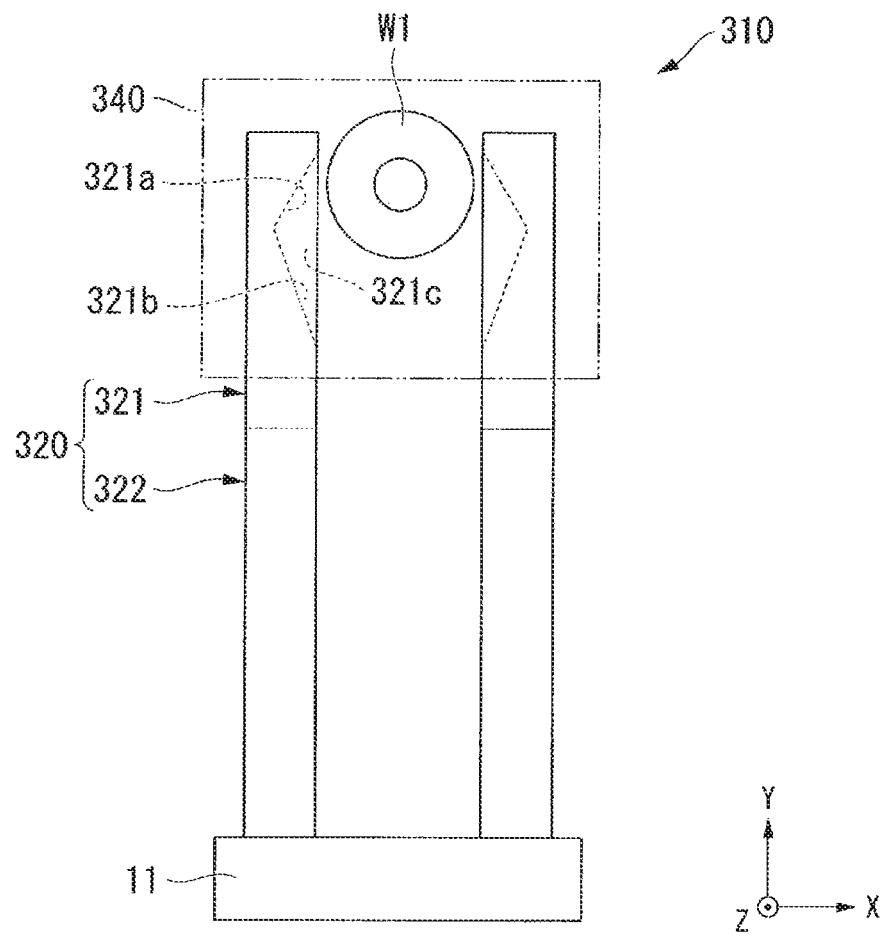
FIGS. 9A and 9B are diagrams showing a configuration of a gripping section according to a fourth embodiment.
Figure 9B:
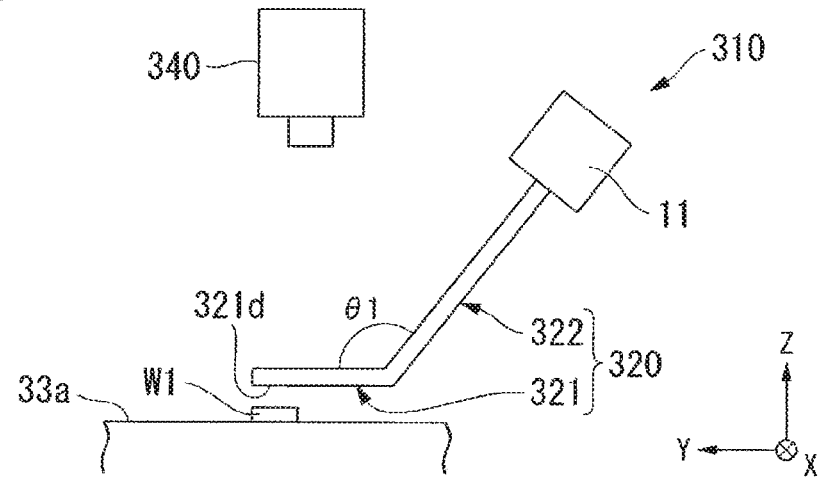

FIGS. 9A and 9B are diagrams showing a configuration of a gripping section 310 according to a fourth embodiment of the invention. FIG. 9A is a plan view corresponding to FIG. 7A, and showing a configuration of the gripping section 310 according to the fourth embodiment of the invention. FIG. 9B is a side view showing the configuration of the gripping section 310 according to the fourth embodiment of the invention. The gripping section 310 of the present embodiment is different from the gripping section 210 explained in the third embodiment described above in the point that a pair of finger sections 320 are each provided with a tip section 321 disposed in parallel to the mounting surface 33a and gripping the first object W1, and a base end section 322 disposed in a direction getting apart from the mounting surface 33a and coupled to the main body section 11. In FIGS. 9A and 9B, the elements substantially the same as those shown in FIGS. 7A and 7B are denoted with the same reference symbols and the detailed explanation therefor will be omitted.

As shown in FIGS. 9A and 9B, the gripping section 310 is provided with the main body section 11 and the pair of finger sections 320. The gripping section 310 is arranged to translate the pair of finger sections 320 in a direction of getting away from each other and a direction of getting close to each other to thereby open and close the pair of finger sections 320.

The pair of finger sections 320 are each provided with the tip section 321 disposed in parallel to the mounting surface 33a and gripping the first object W1, and the base end section 322 disposed in the direction getting apart from the mounting surface 33a and coupled to the main body section 11.

The tip section 321 of each of the pair of finger sections 320 has a plurality of gripping surfaces (here, the two surfaces) 321a, 321b intersecting with each other on the side having contact with the first object W1 on the lateral side thereof. The gripping surfaces 321a, 321b are perpendicular to the mounting surface 33a. The control device 60 (see FIG. 1) performs the control so as to make the tip sections 321 of the pair of finger sections 320 grip the first object W1 at four or more contact points.

The guard 321c for preventing the first object W1 from jumping out in a direction perpendicular to the mounting surface 33a is disposed on the opposite side of the tip section 321 of each of the pair of finger sections 320 to the mounting surface 33a across the first object W1.

The surface 321d of the tip section 321 of each of the pair of finger sections 320 opposed to the mounting surface 33a is a flat plane.

In the pair of finger sections 320, the tip section 321 and the base end section 322 are arranged so as not to overlap each other viewed from the direction (here, the Z-axis direction) in which the image of the tip section 321 is taken by the camera 340. It should be noted that the camera 340 is disposed at the position overlapping the first object W1 viewed from the direction perpendicular to the mounting surface 33a.

In the pair of finger sections 320, the angle θ1 formed between the tip section 321 and the base end section 322 is an obtuse angle.

According to the robot of the present embodiment, it becomes easy to grip the first object W1 at a predetermined position compared to the configuration in which whole of the pair of finger sections is disposed in parallel to the mounting surface. In the case of gripping the first object mounted on the mounting surface, by making the pair of finger sections perform the gripping operation while making the pair of finger sections have contact with the mounting surface, it becomes easy to stably grip the first object. If there is adopted the configuration, for example, in which the tip section and the base end section are arranged in parallel to each other in the pair of finger sections, the main body section and the mounting surface have contact with each other when gripping the first object, and the tip section and the mounting surface become distant from each other to thereby make it difficult to grip the first object. However, according to the configuration of the present embodiment of the invention, it becomes easy to make the tip sections 321 of the pair of finger sections 320 have contact with the mounting surface 33a. Therefore, it becomes easy to grip the first object W1 at a predetermined position.

According to this configuration, it becomes easy to make the tip sections 321 of the pair of finger sections 320 have contact with the mounting surface 33a compared to the configuration in which the surface of the tip section of each of the pair of finger sections opposed to the mounting surface is an uneven surface. Therefore, it becomes easy to grip the first object W1 at a predetermined position.

According to this configuration, it is possible to perform the gripping operation while checking the gripping operation of the tip sections 321.

According to this configuration, it becomes easy to perform the gripping operation while checking the gripping operation of the tip sections 321 compared to the configuration in which the angle formed between the tip section and the base end section is an acute angle. If there is adopted a configuration, for example, in which the angle formed between the tip section and the base end section is an acute angle, there is a possibility that the tip section is shaded by the base end section when viewed from the direction in which the image of the tip section is taken by the camera, and it becomes difficult to detect the accurate gripping operation of the tip sections.

However, according to the configuration of the present embodiment of the invention, the tip sections 321 are hardly shaded by the base end sections 322 viewed from the direction in which the image of the tip sections 321 is taken by the camera 340. Therefore, it becomes easy to perform the gripping operation while checking the gripping operation of the tip sections 321.

Fifth Embodiment

Figure 10:
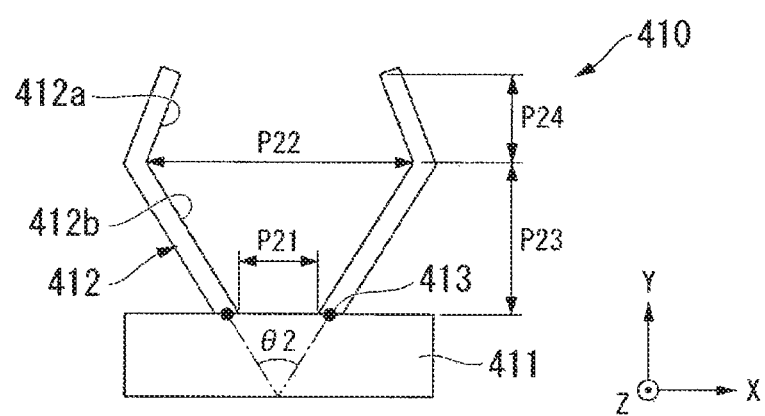
FIG. 10 is a plan view showing a configuration of a gripping section according to a fifth embodiment.

FIG. 10 is a plan view corresponding to FIG. 2 and showing a configuration of a gripping section 410 according to a fifth embodiment of the invention. In FIG. 10, the reference symbol P21 denotes the distance between base ends of a pair of finger sections, the reference symbol P22 denotes the distance between bend sections of the pair of finger sections, the reference symbol P23 denotes the distance between a main body section and the bend sections of the pair of finger sections, and the reference symbol P24 denotes the distance between the bend sections and tip portions of the pair of finger sections. Further, the reference symbol θ2 denotes the angle (specifically, the angle formed between sections each forming a surface 412b in a pair of finger sections 412) formed between the pair of finger sections 412. A gripping section 410 of the present embodiment is different from the gripping section 10A explained in the first embodiment described above in the point that the pair of finger sections 412 is opened and closed by rotating the pair of finger sections 412 around respective rotating shafts (rotational axes) 413 perpendicular to the mounting surface 33a. In FIG. 10, the elements substantially the same as those shown in FIG. 2 are denoted with the same reference symbols and the detailed explanation therefor will be omitted.

As shown in FIG. 10, the gripping section 410 is provided with the main body section 411 and the pair of finger sections 412. The pair of finger sections 412 are coupled to one end of the main body section 411, and are disposed movably based on the side (the side connected to the main body section 411) of the one end. Specifically, the gripping section 410 is arranged to open and close the pair of finger sections 412 by rotating the pair of finger sections 412 around the respective rotating shafts 413 perpendicular to the mounting surface 33a.

The moving mechanism (the rotating mechanism) of the pair of finger sections 412 has a configuration of, for example, providing recesses (through holes) to the main body section 411, providing the rotating shafts 413 to the base ends of the pair of finger sections 412, and rotatably disposing the rotating shafts 413 in the respective recesses to thereby rotate the pair of finger sections 412 around the respective rotating shafts 413 by a drive device such as an electric motor. The pair of finger sections 412 has a configuration of a "single-degree-of-freedom system (the system in which the position of an object can be expressed by a single parameter)" in which the two finger sections 412 are controlled using the rotational angle of the rotation of each of the two finger sections 412 around the rotating shaft 413 as the single parameter.

The pair of finger sections 412 each have a plurality of gripping surfaces 412a, 412b intersecting with each other on the side having contact with the first object W1 on the lateral side thereof. The gripping surfaces 412a, 412b are perpendicular to the mounting surface 33a. The control device 60 (see FIG. 1) performs the control so as to make the pair of finger sections 412 grip the first object W1 at four or more contact points.

Figure 11A:
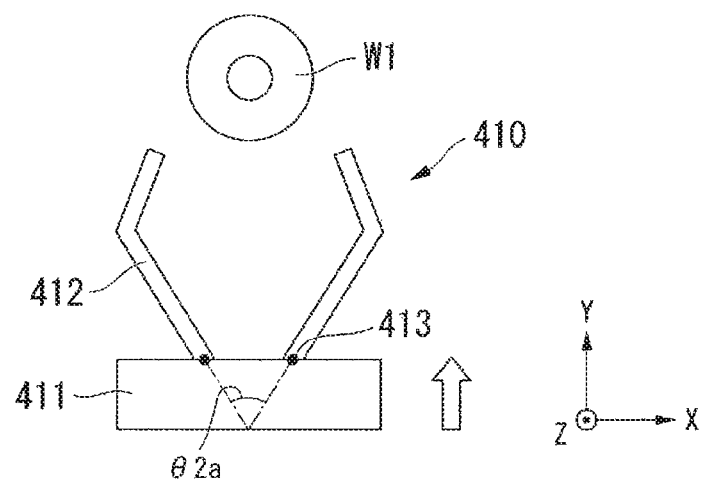
FIGS. 11A through 11D are plan views showing an operation of the gripping section according to the fifth embodiment.
Figure 11B:
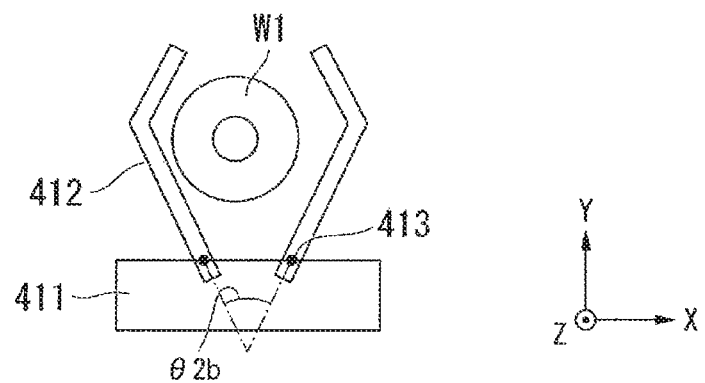
Figure 11C:
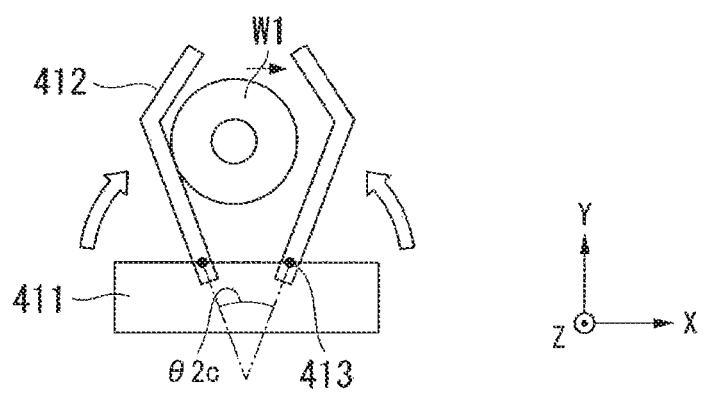
Figure 11D:
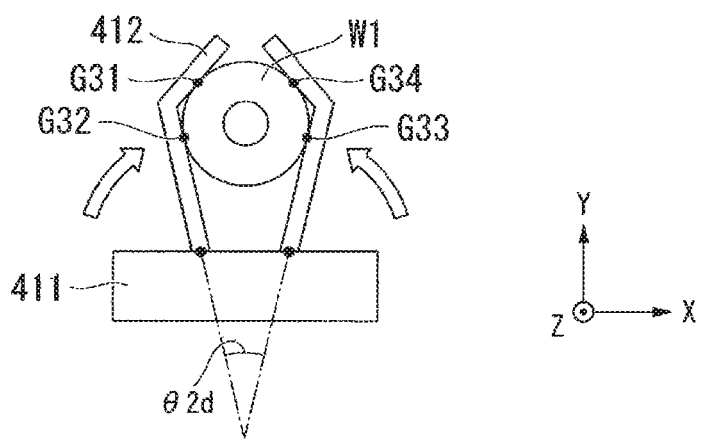

FIGS. 11A through 11D are plan views corresponding respectively to FIGS. 3A through 3D, and showing the operation of the gripping section 410 according to the fifth embodiment. FIG. 11A shows the process of moving the gripping section 410 relatively toward the first object W1, FIG. 11B shows the condition of disposing the pair of finger sections 412 in the periphery of the first object W1, FIG. 11C shows the condition of pinching the first object W1 between the pair of finger sections 412 from the lateral side of the first object W1, and FIG. 11D shows the condition of making the gripping section 410 grip the first object W1. It should be noted that in FIGS. 11A through 11D the reference symbols G31, G32, G33, and G34 denote the contact points between the pair of fingers 412 and the first object W1.

Regarding the step S1 shown in FIG. 4, since the operation is substantially the same as the operation of the gripping section 10A according to the first embodiment, the detailed explanation therefor will be omitted.

As shown in FIG. 11A, the control device 60 controls the arm 20A (see FIG. 1) to move the gripping section 410 relatively toward the first object W1 (step S2 shown in FIG. 4). The angle formed between the pair of finger sections on this occasion is assumed as $\theta 2a$. Subsequently, the control device 60 controls the gripping section 410 to grip the first object W1 with the gripping section 410. Here, the control device 60 makes the gripping section 410 achieve the three functions, namely caging, self-alignment, and frictional gripping of the first object W1.

Specifically, as shown in FIG. 11B, the pair of finger sections 412 is disposed in the periphery of the first object W1, and then the gripping section 410 is controlled to open and close the pair of finger sections 412 in the plane parallel to the mounting surface 33a to thereby make (step S3 shown in FIG. 4) the pair of finger sections 412 surround the periphery of the first object W1. Thus, the first object W1 is prevented from jumping out of the area surrounded by the pair of finger sections 412 (caging). It should be noted that the angle $\theta 2b$ formed between the pair of finger sections 412 on this occasion is set smaller than the angle $\theta 2a$ ($\theta 2b < \theta 2a$).

Subsequently, as shown in FIG. 11C, the first object W1 is pinched between the pair of finger sections 412 from the lateral side of the first object W1 (step S4 shown in FIG. 4). Thus, the first object W1 moves with the pair of finger sections 412, and thus the position thereof is adjusted (self-alignment). It should be noted that the angle $\theta 2c$ formed between the pair of finger sections 412 on this occasion is set smaller than the angle $\theta 2b$ ($\theta 2c < \theta 2b$).

Then, as shown in FIG. 11D, the pair of finger sections 412 are made (step S5 shown in FIG. 4) to grip the first object W1 at three or more contact points (here, the four contact points G31, G32, G33, and G34). Thus, the first object W1 is held at a predetermined position (frictional gripping). It should be noted that the angle $\theta 2d$ formed between the pair of finger sections 412 on this occasion is set smaller than the angle $\theta 2c$ ($\theta 2d < \theta 2c$).

According to the robot of the present embodiment, it is arranged that the pair of finger sections 412 rotate to thereby pinch the first object W1 from the lateral side thereof. Therefore, it results that the first object W1 moves so as to be pulled in in the direction of the rotation of the pair of finger sections 412. Therefore, it is possible to make the open/close mechanism of the pair of finger sections 412 have an easy and simple configuration.

First Modified Example

Figure 12A:
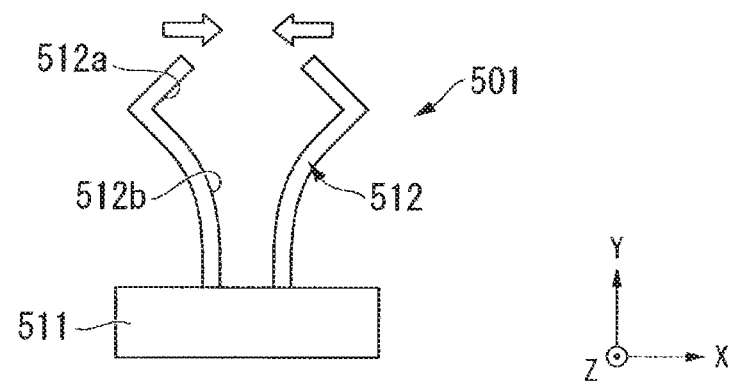
FIGS. 12A through 12C are plan views respectively showing first through third modified examples of the gripping section.
Figure 12B:
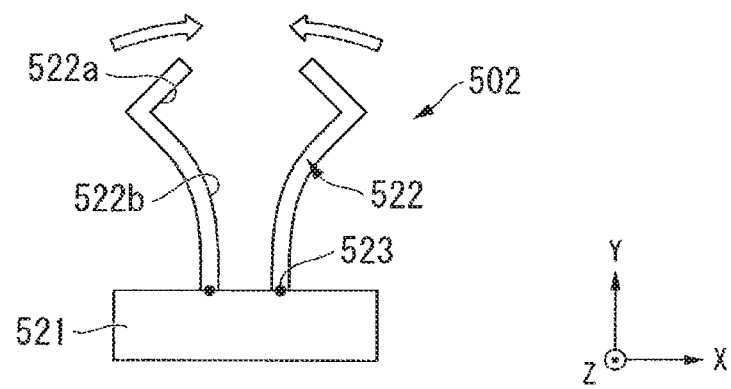
Figure 12C:
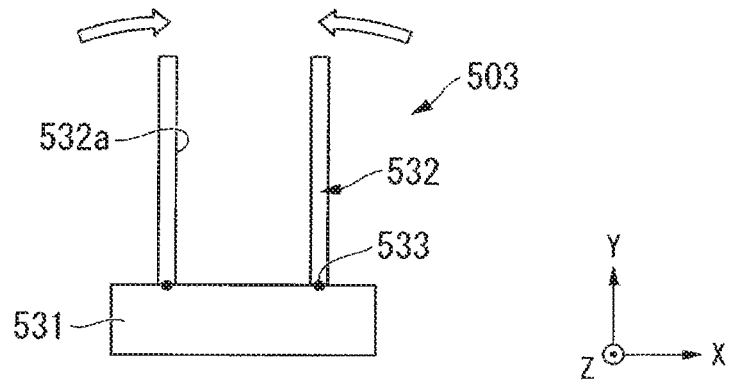

FIGS. 12A through 12C are plan views corresponding to FIG. 2, and showing first through third modified examples of the gripping section according to the invention. FIG. 12A is a plan view showing the first modified example of the gripping section according to the invention. It should be noted that in FIGS. 12A through 12C, the first object W1 is omitted from the illustration for the sake of convenience. A gripping section 501 of the present modified example is different from the gripping section 10A explained in the first embodiment described above in the point that a pair of finger sections 512 each have a curved surface 512b on the side having contact with the first object W1 on the lateral side thereof. In FIG. 12A, the elements substantially the same as those shown in FIG. 2 are denoted with the same reference symbols and the detailed explanation therefor will be omitted.

As shown in FIG. 12A, the gripping section 501 of the present modified example is provided with a main body section 511 and the pair of finger sections 512. The gripping section 501 is arranged to translate the pair of finger sections 512 in a direction of getting away from each other and a direction of getting close to each other to thereby open and close the pair of finger sections 512.

The pair of finger sections 512 each have a plurality of gripping surfaces 512a, 512b intersecting with each other on the side having contact with the first object W1 on the lateral side thereof. The gripping surfaces 512a, 512b are perpendicular to the mounting surface 33a. The control device 60 (see FIG. 1) performs the control so as to make the pair of finger sections 512 grip the first object W1 at four or more contact points.

The pair of finger sections 512 each have the curved surface 512b on the side having contact with the first object W1 on the lateral side thereof. Specifically, the gripping surface 512b located closer to the main body section 511 out of the plurality of surfaces 512a, 512b is formed as a curved surface convex toward the side having contact with the first object W1 on the lateral side thereof.

Second Modified Example

FIG. 12B is a plan view corresponding to FIG. 10, and showing the second modified example of the gripping section according to the invention. A gripping section 502 of the present modified example is different from the gripping section 410 explained in the fifth embodiment described above in the point that a pair of finger sections 522 each have a curved surface 522b on the side having contact with the first object W1 on the lateral side thereof. In FIG. 12B, the elements substantially the same as those shown in FIG. 10 are denoted with the same reference symbols and the detailed explanation therefor will be omitted.

As shown in FIG. 12B, the gripping section 502 is provided with a main body section 521 and the pair of finger sections 522. The gripping section 502 is arranged to open and close the pair of finger sections 522 by rotating the pair of finger sections 522 around respective rotating shafts 523 perpendicular to the mounting surface 33a.

The pair of finger sections 522 each have a plurality of gripping surfaces 522a, 522b intersecting with each other on the side having contact with the first object W1 on the lateral side thereof. The gripping surfaces 522a, 522b are perpendicular to the mounting surface 33a. The control device 60 (see FIG. 1) performs the control so as to make the pair of finger sections 522 grip the first object W1 at four or more contact points.

The pair of finger sections 522 each have the curved surface 522b on the side having contact with the first object W1 on the lateral side thereof. Specifically, the gripping surface 522b located closer to the main body section 521 out of the plurality of surfaces 522a, 522b is formed as a curved surface convex toward the side having contact with the first object W1 on the lateral side thereof.

Third Modified Example

FIG. 12C is a plan view corresponding to FIG. 10, and showing the third modified example of the gripping section according to the invention. A gripping section 503 is different from the gripping section 410 explained in the fifth embodiment described above in the point that a pair of finger sections 532 extend in one direction. In FIG. 12C, the elements substantially the same as those shown in FIG. 10 are denoted with the same reference symbols and the detailed explanation therefor will be omitted.

As shown in FIG. 12C, the gripping section 503 is provided with a main body section 531 and the pair of finger sections 532. The gripping section 503 is arranged to open and close the pair of finger sections 532 by rotating the pair of finger sections 532 around respective rotating shafts 533 perpendicular to the mounting surface 33a.

The pair of finger sections 532 extend in one direction (here, the Y-axis direction). The pair of finger sections 532 each have a flat gripping surface 532a on the side having contact with the first object W1 on the lateral side thereof. The gripping surface 532a is perpendicular to the mounting surface 33a. The control device 60 (see FIG. 1) performs the control so as to make the pair of finger sections 532 and the main body section 531 grip the first object W1 at three or more contact points.

Fourth Modified Example

Figure 13A:
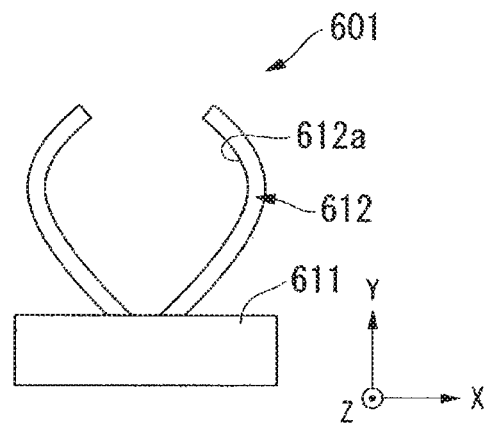
FIGS. 13A through 13F are plan views respectively showing fourth through ninth modified examples of the gripping section.

FIGS. 13A through 13F are plan views corresponding to FIG. 2, and showing fourth through ninth modified examples of the gripping section according to the invention. FIG. 13A is a plan view showing the fourth modified example of the gripping section according to the invention. It should be noted that in FIGS. 13A through 13F, the first object W1 is omitted from the illustration, and the pair of finger sections are represented by lines for the sake of convenience. Further, the configurations described as the fourth through ninth modified examples can be applied to both of the configuration in which the pair of finger sections are translated and the configuration in which the pair of finger sections move rotationally.

As shown in FIG. 13A, a gripping section 601 of the present modified example is provided with a main body section 611 and a pair of finger sections 612. The pair of finger sections 612 are coupled to one end of the main body section 611, and are disposed movably based on the side (the side connected to the main body section 611) of the one end.

The pair of finger sections 612 each have a gripping surface 612a on the side having contact with the first object W1 on the lateral side thereof. The gripping surface 612a is formed as a curved surface concave toward the side having contact with the first object W1 on the lateral side thereof. The gripping surface 612a is perpendicular to the mounting surface 33a. The control device 60 (see FIG. 1) performs the control so as to make the pair of finger sections 612 grip the first object W1 at four or more contact points.

Fifth Modified Example

Figure 13B:
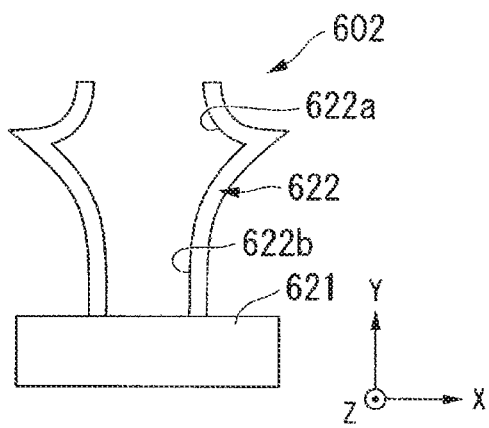

FIG. 13B is a plan view showing the fifth modified example of the gripping section according to the invention. As shown in FIG. 13B, a gripping section 602 of the present modified example is provided with a main body section 621 and a pair of finger sections 622. The pair of finger sections 622 are coupled to one end of the main body section 621, and are disposed movably based on the side (the side connected to the main body section 621) of the one end.

The pair of finger sections 622 each have a plurality of gripping surfaces 622a, 622b intersecting with each other on the side having contact with the first object W1 on the lateral side thereof. The gripping surfaces 622a, 622b are each formed as a curved surface convex toward the side having contact with the first object W1 on the lateral side thereof. The gripping surfaces 622a, 622b are perpendicular to the mounting surface 33a. The control device 60 (see FIG. 1) performs the control so as to make the pair of finger sections 622 grip the first object W1 at four or more contact points.

Sixth Modified Example

Figure 13C:
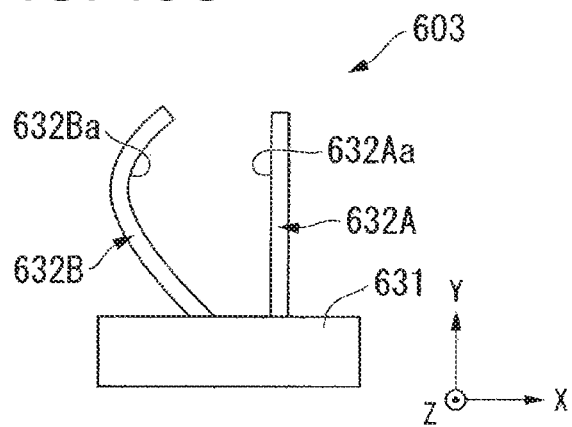

FIG. 13C is a plan view showing the sixth modified example of the gripping section according to the invention. As shown in FIG. 13C, a gripping section 603 of the present modified example is provided with a main body section 631 and a pair of finger sections 632A, 632B. The pair of finger sections 632A, 632B are coupled to one end of the main body section 631, and are disposed movably based on the side (the side connected to the main body section 631) of the one end.

The finger section 632A, one of the pair of finger sections 632A, 632B, has a flat gripping surface 632Aa on the side having contact with the first object W1 on the lateral side thereof. The gripping surface 632Aa is perpendicular to the mounting surface 33a.

The finger section 632B, the other of the pair of finger sections 632A, 632B, has a gripping surface 632Ba on the side having contact with the first object W1 on the lateral side thereof. The gripping surface 632Ba is formed as a curved surface concave toward the side having contact with the first object W1 on the lateral side thereof. The gripping surface 632Ba is perpendicular to the mounting surface 33a. The control device 60 (see FIG. 1) performs the control so as to make the pair of finger sections 632A, 632B grip the first object W1 at three or more contact points.

Seventh Modified Example

Figure 13D:
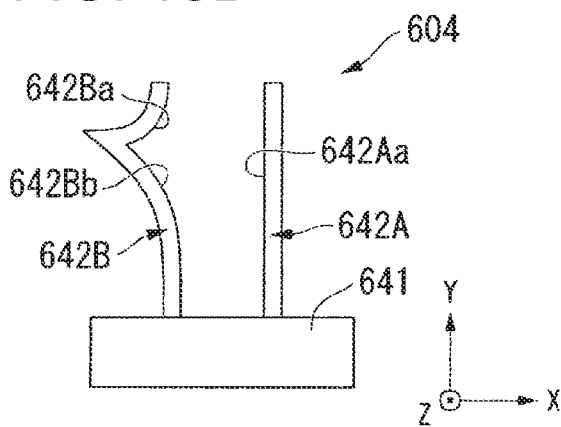

FIG. 13D is a plan view showing the seventh modified example of the gripping section according to the invention. As shown in FIG. 13D, a gripping section 604 of the present modified example is provided with a main body section 641 and a pair of finger sections 642A, 642B. The pair of finger sections 642A, 642B are coupled to one end of the main body section 641, and are disposed movably based on the side (the side connected to the main body section 641) of the one end.

The finger section 642A, one of the pair of finger sections 642A, 642B, has a flat gripping surface 642Aa on the side having contact with the first object W1 on the lateral side thereof. The gripping surface 642Aa is perpendicular to the mounting surface 33a.

The finger section 642B, the other of the pair of finger sections 642A, 642B, has a plurality of gripping surfaces 642Ba, 642Bb intersecting with each other on the side having contact with the first object W1 on the lateral side thereof. The gripping surfaces 642Ba, 642Bb are each formed as a curved surface convex toward the side having contact with the first object W1 on the lateral side thereof. The gripping surfaces 642Ba, 642Bb are perpendicular to the mounting surface 33a. The control device 60 (see FIG. 1) performs the control so as to make the pair of finger sections 642A, 642B grip the first object W1 at three or more contact points.

Eighth Modified Example

Figure 13E:
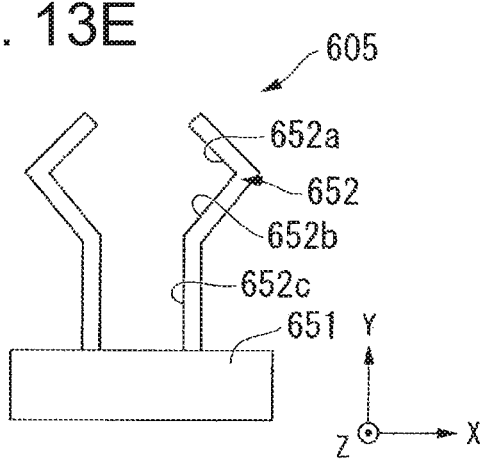

FIG. 13E is a plan view showing the eighth modified example of the gripping section according to the invention. As shown in FIG. 13E, a gripping section 605 of the present modified example is provided with a main body section 651 and a pair of finger sections 652. The pair of finger sections 652 are coupled to one end of the main body section 651, and are disposed movably based on the side (the side connected to the main body section 651) of the one end.

The pair of finger sections 652 each have a plurality of flat surfaces 652a, 652b, and 652c intersecting with each other on the side having contact with the first object W1 on the lateral side thereof. The surfaces 652a, 652b, and 652c are continuously adjacent to each other. The surfaces 652a, 652b out of the surfaces 652a, 652b, and 652c form gripping surfaces for gripping the first object W1. In contrast, the surface 652c, the rest of the surfaces, forms a surface not gripping the first object W1. The surfaces 652a, 652b, and 652c are perpendicular to the mounting surface 33a. The control device 60 (see FIG. 1) performs the control so as to make the pair of finger sections 652 (the surfaces 652a, 652b) grip the first object W1 at four or more contact points.

Ninth Modified Example

Figure 13F:
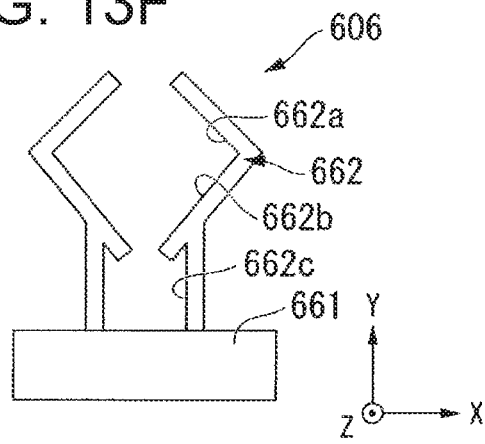

FIG. 13F is a plan view showing the ninth modified example of the gripping section according to the invention. As shown in FIG. 13F, a gripping section 606 of the present modified example is provided with a main body section 661 and a pair of finger sections 662. The pair of finger sections 662 are coupled to one end of the main body section 661, and are disposed movably based on the side (the side connected to the main body section 661) of the one end.

The pair of finger sections 662 each have a plurality of flat surfaces 662a, 662b, and 662c intersecting with each other on the side having contact with the first object W1 on the lateral side thereof. The surfaces 662a, 662b out of the surfaces 662a, 662b, and 662c are continuously adjacent to each other. The surfaces 662a, 662b out of the surfaces 662a, 662b, and 662c form gripping surfaces for gripping the first object W1. In contrast, the surface 662c, the rest of the surfaces, forms a surface not gripping the first object W1. The surfaces 662a, 662b, and 662c are perpendicular to the mounting surface 33a. The control device 60 (see FIG. 1) performs the control so as to make the pair of finger sections 662 (the surfaces 662a, 662b) grip the first object W1 at four or more contact points.

Tenth Modified Example

Figure 14:
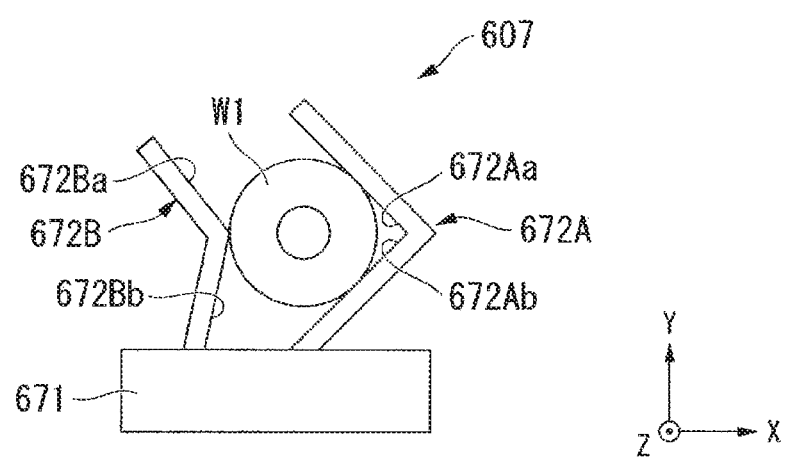
FIG. 14 is a plan view showing a tenth modified example of the gripping section.

FIG. 14 is a plan view corresponding to FIG. 2, and showing the tenth modified example of the gripping section according to the invention. It should be noted that the configuration described as the tenth modified example can be applied to both of the configuration in which the pair of finger sections are translated and the configuration in which the pair of finger sections move rotationally.

As shown in FIG. 14, a gripping section 607 of the present modified example is provided with a main body section 671 and a pair of finger sections 672A, 672B. The pair of finger sections 672A, 672B are coupled to one end of the main body section 671, and are disposed movably based on the side (the side connected to the main body section 671) of the one end.

The finger section 672A, one of the pair of finger sections 672A, 672B, is formed having a concave shape on the side having contact with the first object W1 on the lateral side thereof. The finger section 672A, the one of the pair of finger sections 672A, 672B, has a plurality of flat surfaces 672Aa, 672Ab intersecting with each other on the side having contact with the first object W1 on the lateral side thereof. The surfaces 672Aa, 672Ab are continuously adjacent to each other. The surfaces 672Aa, 672Ab form gripping surfaces for gripping the first object W1. The surfaces 672Aa, 672Ab are perpendicular to the mounting surface 33a.

The finger section 672B, the other of the pair of finger sections 672A, 672B, is formed having a convex shape on the side having contact with the first object W1 on the lateral side thereof. The finger section 672B, the other of the pair of finger sections 672A, 672B, has a plurality of flat surfaces 672Ba, 672Bb intersecting with each other on the side having contact with the first object W1 on the lateral side thereof. The surfaces 672Ba, 672Bb are continuously adjacent to each other. The part (bend section) where the surfaces 672Ba, 672Bb intersect with each other forms the part for gripping the first object W1. The surfaces 672Ba, 672Bb are perpendicular to the mounting surface 33a. The control device 60 (see FIG. 1) performs the control so as to make the pair of finger sections 672A, 672B (the surfaces 672Aa, 672Ab of the one finger section 672A, and the bend section of the other finger section 672B) grip the first object W1 at three or more contact points.

Eleventh Modified Example

Figure 15A:
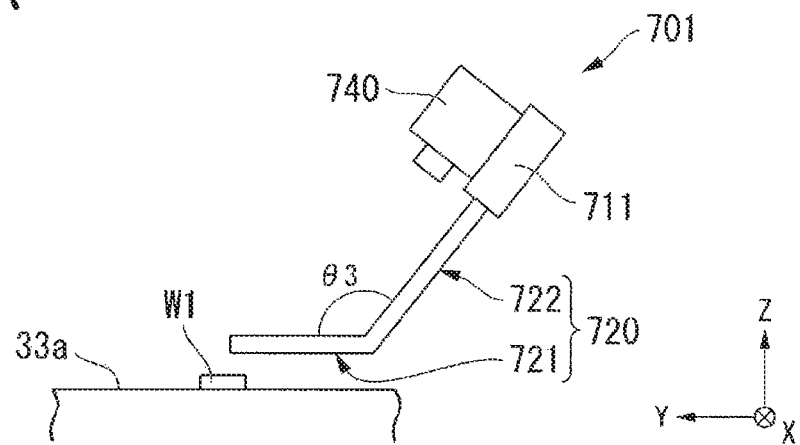
FIGS. 15A through 15C are side views respectively showing eleventh through thirteenth modified examples of the gripping section.
Figure 15B:
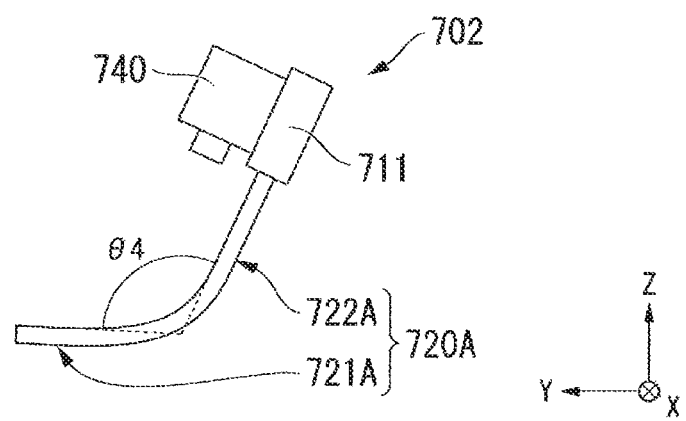
Figure 15C:
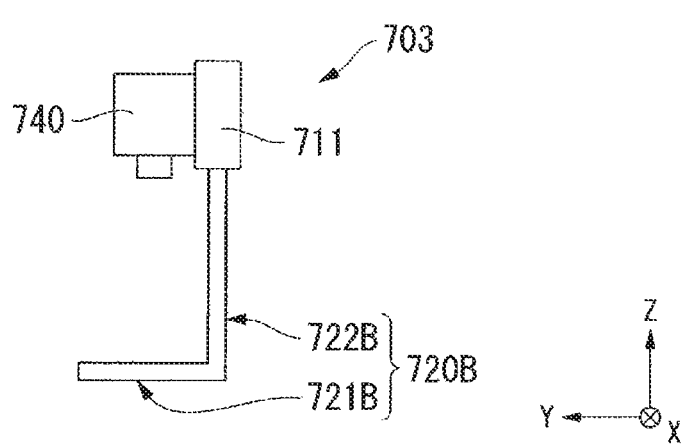

FIGS. 15A through 15C are side views corresponding to FIG. 9B, and showing eleventh through thirteenth modified examples of the gripping section according to the invention. FIG. 15A is a side view showing the eleventh modified example of the gripping section according to the invention. It should be noted that, the configurations described as the eleventh through thirteenth modified examples can be applied to both of the configuration in which the pair of finger sections are translated and the configuration in which the pair of finger sections move rotationally.

As shown in FIG. 15A, a gripping section 701 of the present modified example is provided with a main body section 711 and a pair of finger sections 720. The pair of finger sections 720 are coupled to one end of the main body section 711, and are disposed movably based on the side (the side connected to the main body section 711) of the one end.

The pair of finger sections 720 are each provided with a tip section 721 disposed in parallel to the mounting surface 33a and gripping the first object W1, and a base end section 722 disposed in the direction getting apart from the mounting surface 33a and coupled to the main body section 711.

In the pair of finger sections 720, the tip section 721 and the base end section 722 are arranged so as not to overlap each other viewed from the direction in which the image of the tip section 721 is taken by a camera 740. In the pair of finger sections 720, the angle θ3 formed between the tip section 721 and the base end section 722 is an obtuse angle. The camera 740 is attached to the main body section 711.

According to the robot of the present modified example, since the camera 740 is disposed at a position near to the pair of finger sections 720, it is possible to perform accurate positioning of the pair of finger sections 720 for gripping the first object W1.

Twelfth Modified Example

FIG. 15B is a side view showing the twelfth modified example of the gripping section according to the invention. It should be noted that in FIG. 15B, the first object W1 is omitted from the illustration for the sake of convenience.

As shown in FIG. 15B, a gripping section 702 of the present modified example is provided with the main body section 711 and a pair of finger sections 720A. The pair of finger sections 720A are coupled to one end of the main body section 711, and are disposed movably based on the side (the side connected to the main body section 711) of the one end.

The pair of finger sections 720A are each provided with a tip section 721A disposed in parallel to the mounting surface 33a and gripping the first object W1, and a base end section 722A disposed in the direction getting apart from the mounting surface 33a and coupled to the main body section 711. A connection section between the tip section 721A and the base end section 722A has a curved shape.

In the pair of finger sections 720A, the tip section 721A and the base end section 722A are arranged so as not to overlap each other viewed from the direction in which the image of the tip section 721A is taken by the camera 740. In the pair of finger sections 720A, the angle (the angle formed between the straight portions in a side view) θ4 formed between the tip section 721A and the base end section 722A is an obtuse angle. The camera 740 is attached to the main body section 711.

Thirteenth Modified Example

FIG. 15C is a side view showing the thirteenth modified example of the gripping section according to the invention. It should be noted that in FIG. 15C, the first object W1 is omitted from the illustration for the sake of convenience.

As shown in FIG. 15C, a gripping section 703 of the present modified example is provided with the main body section 711 and a pair of finger sections 720B. The pair of finger sections 720B are coupled to one end of the main body section 711, and are disposed movably based on the side (the side connected to the main body section 711) of the one end.

The pair of finger sections 720B are each provided with a tip section 721B disposed in parallel to the mounting surface 33a and gripping the first object W1, and a base end section 722B disposed in the direction getting apart from the mounting surface 33a and coupled to the main body section 711.

In the pair of finger sections 720B, the tip section 721B and the base end section 722B are arranged so as not to overlap each other viewed from the direction in which the image of the tip section 721B is taken by the camera 740. In the pair of finger sections 720B, the angle (the angle formed between the straight portions in a side view) formed between the tip section 721B and the base end section 722B is a right angle. The camera 740 is attached to the main body section 711.

It should be noted that although in the embodiments described above the robot has the configuration of moving the gripping section using a scalar robot, and making the gripping section grip the object, the configuration is not limited thereto. It is also possible to adopt a configuration of, for example, moving the gripping section using a robot of another type such as a Cartesian coordinate robot, and making the gripping section grip the object.

Further, although in the embodiments described above the robot has the configuration in which the arms (the moving devices) are attached on the base, the configuration is not limited thereto. It is also possible to adopt a configuration in which a bridge section striding the stage is attached to the base, and the arms are suspended from the bridge section.

What is claimed is:
1. A robot comprising:
a base;
a shaft upstanding from the base;
a first arm having a proximal end and a distal end, the proximal end of the first arm being rotatably connected to the shaft;
a second arm having a proximal end and a distal end, the proximal end of the second arm being rotatably connected to the distal end of the first arm;
a third arm having a proximal end and a distal end, the third arm being movably connected to the distal end of the second arm, the third arm being axially translatable relative to the second arm;
a fourth arm having a proximal end and a distal end, the proximal end of the fourth arm being rotatably connected to the shaft;

a fifth arm having a proximal end and a distal end, the proximal end of the fifth arm being rotatably connected to the distal end of the fourth arm; and a sixth arm having a proximal end and a distal end, the sixth arm being movably connected to the distal end of the fifth arm, the sixth arm being axially translatable relative to the fifth arm, wherein the first, second, and third arms configure a first SCARA arm set, and the fourth, fifth, and sixth arms configure a second SCARA arm set.

2. The robot according to claim 1, further comprising:
a first gripping member that is attached to the distal end of the third arm, the first gripping member being rotatable relative to the second arm,
wherein the first gripping member is configured with first and second fingers,
the first and second fingers are configured to grip a first object therebetween.

3. The robot according to claim 2, further comprising:
a first camera that is configured to take a first image of the first object; and
a control device, the control device including:
   a memory that is configured to store computer-readable instructions; and
   a processor that is configured to execute the computer-readable instructions so as to:
      cause the first camera to transmit the first image to the control device; and
      move the first and second fingers to grip the first object based on the first image.

4. The robot according to claim 2, further comprising:
a first detector that is configured to detect a force for gripping the first object and to output a first detection result; and
a control device, the control device including:
   a memory that is configured to store computer-readable instructions; and
   a processor that is configured to execute the computer-readable instructions so as to:
      cause the first detector to transmit the first detection result to the control device; and
      move the first and second fingers to grip the first object based on the first detection result.

5. The robot according to claim 2, further comprising:
a second gripping member that is attached to the distal end of the sixth arm, the second gripping member being rotatable relative to the fifth arm,
wherein the second gripping member is configured with third and fourth fingers, and
the third and fourth fingers are configured to grip a second object therebetween.

6. The robot according to claim 5, further comprising:
a first camera that is configured to take a first image of the first object;
a control device, the control device including:
   a memory that is configured to store computer-readable instructions; and
   a processor that is configured to execute the computer-readable instructions so as to:
      cause the first camera to transmit the first image to the control device; and
      move the first and second fingers to grip the first object based on the first image; and
a second camera that is configured to take a second image of the second object, wherein the processor is configured to execute the computer-readable instructions so as to:
   cause the second camera to transmit the second image to the control device; and
   move the third and fourth fingers to grip the second object based on the second image.

7. The robot according to claim 5, further comprising:
a first detector that is configured to detect a force for gripping the first object and to output a first detection result;
a control device, the control device including:
   a memory that is configured to store computer-readable instructions; and
   a processor that is configured to execute the computer-readable instructions so as to:
      cause the first detector to transmit the first detection result to the control device; and
      move the first and second fingers to grip the first object based on the first detection result, and
a second detector that is configured to detect a force for gripping the second object and to output a second detection result,
wherein the processor is configured to execute the computer-readable instructions so as to:
   cause the second detector to transmit the second detection result to the control device; and
   move the third and fourth fingers to grip the second object based on the second detection result.

8. A dual arm robot comprising:
a base shaft;
a first SCARA arm assembly mounted to the base shaft, and
a second SCARA arm assembly mounted to the base shaft,
wherein each of the first and second SCARA arm assemblies includes:
   an inner arm having a proximal end and a distal end, the proximal end of the inner arm being rotatably mounted to the base shaft;
   an outer arm having a proximal end and a distal end, the proximal end of the outer arm being rotatably mounted to the distal end of the inner arm; and
   an end arm having a proximal end and a distal end, the end arm being axially translatably connected to the distal end of the outer arm.

9. The dual arm robot according to claim 8,
wherein the first SCARA arm assembly further includes a first gripper attached to the distal end of the end arm, the first gripper being rotatable relative to the outer arm,
the first gripper being configured with first and second fingers, and
the first and second fingers being configured to grip a first object therebetween.

10. The dual arm robot according to claim 9, further comprising:
a first camera operatively associated with the first SCARA arm assembly, the first camera being configured to take a first image of the first object; and
a control device, the control device including:
   a memory that is configured to store computer-readable instructions; and
   a processor that is configured to execute the computer-readable instructions so as to:
      cause the first camera to transmit the first image to the control device; and move the first and second fingers to grip the first object based on the first image.

11. The dual arm robot according to claim 9, further comprising:
a first detector operatively associated with the first SCARA arm assembly, the first detector being configured to detect a force for gripping the first object and to output a first detection result; and
a control device, the control device including:
a memory that is configured to store computer-readable instructions; and
a processor that is configured to execute the computer-readable instructions so as to:
cause the first detector to transmit the first detection result to the control device; and
move the first and second fingers to grip the first object based on the first detection result.

12. The dual arm robot according to claim 9,
wherein the second SCARA arm assembly further includes a second gripper attached to the distal end of the end arm, the second gripper being rotatable relative to the outer arm,
the second gripper being configured with third and fourth fingers, and
the third and fourth fingers being configured to grip a second object therebetween.

13. The dual arm robot according to claim 12, further comprising:
a first camera operatively associated with the first SCARA arm assembly, the first camera being configured to take a first image of the first object;
a control device, the control device including:
a memory that is configured to store computer-readable instructions; and
a processor that is configured to execute the computer-readable instructions so as to:
cause the first camera to transmit the first image to the control device; and
move the first and second fingers to grip the first object based on the first image; and
a second camera operatively associated with the second SCARA arm assembly, the second camera being configured to take a second image of the second object,
wherein the processor is configured to execute the computer-readable instructions so as to:
cause the second camera to transmit the second image to the control device; and
move the third and fourth fingers to grip the second object based on the second image.

14. The dual arm robot according to claim 12, further comprising:
a first detector operatively associated with the first SCARA arm assembly, the first detector being configured to detect a force for gripping the first object and to output a first detection result;
a control device, the control device including:
a memory that is configured to store computer-readable instructions; and
a processor that is configured to execute the computer-readable instructions so as to:
cause the first detector to transmit the first detection result to the control device; and
move the first and second fingers to grip the first object based on the first detection result; and
a second detector operatively associated with the second SCARA arm assembly, the second detector being configured to detect a force for gripping the second object and to output a second detection result,
wherein the processor is configured to execute the computer-readable instructions so as to:
cause the second detector to transmit the second detection result to the control device; and
move the third and fourth fingers to grip the second object based on the second detection result.

* * * * *